United States Patent
Krah

(10) Patent No.: US 8,493,330 B2
(45) Date of Patent: Jul. 23, 2013

(54) INDIVIDUAL CHANNEL PHASE DELAY SCHEME

(75) Inventor: Christoph Horst Krah, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 1341 days.

(21) Appl. No.: 11/650,203

(22) Filed: Jan. 3, 2007

(65) Prior Publication Data

US 2008/0157867 A1 Jul. 3, 2008

(51) Int. Cl.
G09G 5/00 (2006.01)

(52) U.S. Cl.
USPC ......... 345/173; 345/156; 345/178; 178/18.06

(58) Field of Classification Search
USPC ............. 345/156, 173–179; 178/18.01–18.09
See application file for complete search history.

(56) References Cited

U.S. PATENT DOCUMENTS

| | | | |
|---|---|---|---|
| 2,751,555 A | 6/1956 | Kirkpatrick | |
| 3,333,160 A | 7/1967 | Gorski | |
| 3,541,541 A | 11/1970 | Englebart | |
| 3,644,835 A | 2/1972 | Thompson | |
| 3,662,105 A | 5/1972 | Hurst et al. | |
| 3,798,370 A | 3/1974 | Hurst | |
| 3,974,332 A | 8/1976 | Abe et al. | |
| 4,194,083 A | 3/1980 | Abe et al. | |
| 4,233,522 A | 11/1980 | Grummer et al. | |
| 4,246,452 A | 1/1981 | Chandler | |
| 4,250,495 A | 2/1981 | Beckerman et al. | |
| 4,266,144 A | 5/1981 | Bristol | |
| 4,268,815 A | 5/1981 | Eventoff et al. | |
| 4,277,517 A | 7/1981 | Smith, Jr. | |
| 4,290,052 A | 9/1981 | Eichelberger et al. | |
| 4,307,383 A | 12/1981 | Brienza | |
| 4,313,108 A | 1/1982 | Yoshida | |
| 4,345,000 A | 8/1982 | Kawazoe et al. | |
| 4,363,027 A | 12/1982 | Brienza | |
| 4,394,643 A | 7/1983 | Williams | |
| 4,526,043 A | 7/1985 | Boie et al. | |
| 4,550,221 A | 10/1985 | Mabusth | |
| 4,587,378 A | 5/1986 | Moore | |

(Continued)

FOREIGN PATENT DOCUMENTS

| | | |
|---|---|---|
| AU | 2005246219 A1 | 12/2005 |
| CA | 1243096 A | 10/1988 |

(Continued)

OTHER PUBLICATIONS

International Search Report mailed Jun. 24, 2008, for PCT Application No. PCT/US2007/026298, filed Dec. 21, 2007, two pages.

(Continued)

*Primary Examiner* — Kevin M Nguyen
*Assistant Examiner* — Jennifer Nguyen
(74) *Attorney, Agent, or Firm* — Morrison & Foerster LLP

(57) ABSTRACT

Embodiments of the present invention are directed to processing an incoming signal by using a demodulation signal, while controlling the phase of the demodulation signal in relation to the incoming signal. The incoming signal can be processed by being mixed with the modulation signal at a mixer. The mixing may thus cause various beneficial modifications of the incoming signal, such as noise suppression of the incoming signal, rectification of the incoming signal, demodulation of the incoming signal, etc.

49 Claims, 12 Drawing Sheets

U.S. PATENT DOCUMENTS

| | | | |
|---|---|---|---|
| 4,618,989 A | 10/1986 | Tsukune et al. | |
| 4,623,757 A | 11/1986 | Marino | |
| 4,639,720 A | 1/1987 | Rympalski et al. | |
| 4,672,364 A | 6/1987 | Lucas | |
| 4,672,558 A | 6/1987 | Beckes et al. | |
| 4,686,332 A | 8/1987 | Greanias et al. | |
| 4,692,809 A | 9/1987 | Beining et al. | |
| 4,695,827 A | 9/1987 | Beining et al. | |
| 4,707,845 A | 11/1987 | Krein et al. | |
| 4,723,056 A | 2/1988 | Tamaru et al. | |
| 4,733,222 A | 3/1988 | Evans | |
| 4,734,685 A | 3/1988 | Watanabe et al. | |
| 4,740,781 A | 4/1988 | Brown | |
| 4,746,770 A | 5/1988 | McAvinney | |
| 4,771,276 A | 9/1988 | Parks | |
| 4,772,885 A | 9/1988 | Uehara et al. | |
| 4,788,384 A | 11/1988 | Bruere-Dawson et al. | |
| 4,806,709 A | 2/1989 | Evans | |
| 4,806,846 A | 2/1989 | Kerber | |
| 4,853,493 A | 8/1989 | Schlosser et al. | |
| 4,898,555 A | 2/1990 | Sampson | |
| 4,910,504 A | 3/1990 | Eriksson | |
| 4,914,624 A | 4/1990 | Dunthorn | |
| 4,916,308 A | 4/1990 | Meadows | |
| 4,954,823 A | 9/1990 | Binstead | |
| 4,968,877 A | 11/1990 | McAvinney et al. | |
| 5,003,519 A | 3/1991 | Noirjean | |
| 5,017,030 A | 5/1991 | Crews | |
| 5,062,198 A | 11/1991 | Sun | |
| 5,073,950 A | 12/1991 | Colbert et al. | |
| 5,105,186 A | 4/1992 | May | |
| 5,105,288 A | 4/1992 | Senda et al. | |
| 5,113,041 A | 5/1992 | Blonder et al. | |
| 5,117,071 A | 5/1992 | Greanias et al. | |
| 5,178,477 A | 1/1993 | Gambaro | |
| 5,189,403 A | 2/1993 | Franz et al. | |
| 5,194,862 A | 3/1993 | Edwards et al. | |
| 5,224,861 A | 7/1993 | Glass et al. | |
| 5,239,152 A | 8/1993 | Caldwell et al. | |
| 5,241,308 A | 8/1993 | Young | |
| 5,252,951 A | 10/1993 | Tannenbaum et al. | |
| 5,281,966 A | 1/1994 | Walsh | |
| 5,293,430 A | 3/1994 | Shiau et al. | |
| 5,305,017 A | 4/1994 | Gerpheide | |
| 5,345,543 A | 9/1994 | Capps et al. | |
| 5,353,135 A | 10/1994 | Edwards | |
| 5,374,787 A | 12/1994 | Miller et al. | |
| 5,376,948 A | 12/1994 | Roberts | |
| 5,381,160 A | 1/1995 | Landmeier | |
| 5,386,219 A | 1/1995 | Greanias et al. | |
| 5,392,058 A | 2/1995 | Tagawa | |
| 5,398,310 A | 3/1995 | Tchao et al. | |
| 5,432,671 A | 7/1995 | Allavena | |
| 5,442,742 A | 8/1995 | Greyson et al. | |
| 5,457,289 A | 10/1995 | Huang et al. | |
| 5,459,463 A | 10/1995 | Gruaz et al. | |
| 5,463,388 A | 10/1995 | Boie et al. | |
| 5,463,696 A | 10/1995 | Beernink et al. | |
| 5,483,261 A | 1/1996 | Yasutake | |
| 5,488,204 A | 1/1996 | Mead et al. | |
| 5,495,077 A | 2/1996 | Miller et al. | |
| 5,499,026 A | 3/1996 | Liao et al. | |
| 5,513,309 A | 4/1996 | Meier et al. | |
| 5,523,775 A | 6/1996 | Capps | |
| 5,530,455 A | 6/1996 | Gillick et al. | |
| 5,534,892 A | 7/1996 | Tagawa | |
| 5,543,588 A | 8/1996 | Bisset et al. | |
| 5,543,589 A | 8/1996 | Buchana et al. | |
| 5,543,590 A | 8/1996 | Gillespie et al. | |
| 5,543,591 A | 8/1996 | Gillespie et al. | |
| 5,550,659 A | 8/1996 | Fujieda et al. | |
| 5,552,787 A | 9/1996 | Schuler et al. | |
| 5,563,632 A | 10/1996 | Roberts | |
| 5,563,727 A | 10/1996 | Larson et al. | |
| 5,563,996 A | 10/1996 | Tchao | |
| 5,565,658 A * | 10/1996 | Gerpheide et al. | 178/18.02 |
| 5,572,205 A | 11/1996 | Caldwell et al. | |
| 5,576,070 A | 11/1996 | Yaniv | |
| 5,579,036 A | 11/1996 | Yates, IV | |
| 5,581,681 A | 12/1996 | Tchao et al. | |
| 5,583,946 A | 12/1996 | Gourdol | |
| 5,589,856 A | 12/1996 | Stein et al. | |
| 5,590,219 A | 12/1996 | Gourdol | |
| 5,592,566 A | 1/1997 | Pagallo et al. | |
| 5,594,806 A | 1/1997 | Colbert | |
| 5,594,810 A | 1/1997 | Gourdol | |
| 5,596,694 A | 1/1997 | Capps | |
| 5,612,719 A | 3/1997 | Beernink et al. | |
| 5,623,280 A | 4/1997 | Akins et al. | |
| 5,631,805 A | 5/1997 | Bonsall et al. | |
| 5,633,955 A | 5/1997 | Bozinovic et al. | |
| 5,634,102 A | 5/1997 | Capps | |
| 5,636,101 A | 6/1997 | Bonsall et al. | |
| 5,638,093 A | 6/1997 | Takahashi et al. | |
| 5,642,108 A | 6/1997 | Gopher et al. | |
| 5,644,657 A | 7/1997 | Capps et al. | |
| 5,648,642 A | 7/1997 | Miller et al. | |
| 5,650,597 A | 7/1997 | Redmayne | |
| 5,666,113 A | 9/1997 | Logan | |
| 5,666,502 A | 9/1997 | Capps | |
| 5,666,552 A | 9/1997 | Greyson et al. | |
| 5,675,361 A | 10/1997 | Santilli | |
| 5,677,710 A | 10/1997 | Thompson-Rohrlich | |
| 5,677,744 A | 10/1997 | Yoneda et al. | |
| 5,689,253 A | 11/1997 | Hargreaves et al. | |
| 5,710,844 A | 1/1998 | Capps et al. | |
| 5,729,250 A | 3/1998 | Bishop et al. | |
| 5,730,165 A | 3/1998 | Philipp | |
| 5,734,742 A | 3/1998 | Asaeda et al. | |
| 5,734,751 A | 3/1998 | Saito | |
| 5,736,976 A | 4/1998 | Cheung | |
| 5,741,990 A | 4/1998 | Davies et al. | |
| 5,745,116 A | 4/1998 | Pisutha-Arnond | |
| 5,745,716 A | 4/1998 | Tchao et al. | |
| 5,748,269 A | 5/1998 | Harris et al. | |
| 5,764,218 A | 6/1998 | Bona et al. | |
| 5,764,818 A | 6/1998 | Capps et al. | |
| 5,767,457 A | 6/1998 | Gerpheide et al. | |
| 5,767,842 A | 6/1998 | Korth et al. | |
| 5,777,596 A | 7/1998 | Herbert | |
| 5,790,104 A | 8/1998 | Shieh | |
| 5,790,106 A | 8/1998 | Hirano et al. | |
| 5,790,107 A | 8/1998 | Kasser et al. | |
| 5,802,516 A | 9/1998 | Shwarts et al. | |
| 5,805,144 A | 9/1998 | Scholder et al. | |
| 5,808,567 A | 9/1998 | McCloud | |
| 5,809,166 A | 9/1998 | Huang et al. | |
| 5,809,267 A | 9/1998 | Moran et al. | |
| 5,815,141 A | 9/1998 | Phares | |
| 5,821,690 A | 10/1998 | Martens et al. | |
| 5,821,930 A | 10/1998 | Hansen | |
| 5,823,782 A | 10/1998 | Marcus et al. | |
| 5,825,351 A | 10/1998 | Tam | |
| 5,825,352 A | 10/1998 | Bisset et al. | |
| 5,835,079 A | 11/1998 | Shieh | |
| 5,838,308 A | 11/1998 | Knapp et al. | |
| 5,841,078 A | 11/1998 | Miller et al. | |
| 5,841,415 A | 11/1998 | Kwon et al. | |
| 5,844,506 A | 12/1998 | Binstead et al. | |
| 5,847,690 A | 12/1998 | Boie et al. | |
| 5,852,487 A | 12/1998 | Fujimori et al. | |
| 5,854,450 A | 12/1998 | Kent | |
| 5,854,625 A | 12/1998 | Frisch et al. | |
| 5,856,822 A | 1/1999 | Du et al. | |
| 5,861,583 A * | 1/1999 | Schediwy et al. | 178/18.06 |
| 5,861,875 A | 1/1999 | Gerpheide | |
| 5,867,151 A | 2/1999 | Nakai | |
| 5,869,790 A | 2/1999 | Shigetaka et al. | |
| 5,869,791 A | 2/1999 | Young | |
| 5,880,411 A | 3/1999 | Gillespie et al. | |
| 5,898,434 A | 4/1999 | Small et al. | |
| 5,914,465 A | 6/1999 | Allen et al. | |
| 5,917,165 A | 6/1999 | Platt et al. | |
| 5,920,298 A | 7/1999 | McKnight | |
| 5,920,309 A * | 7/1999 | Bisset et al. | 345/173 |
| 5,923,319 A | 7/1999 | Bishop et al. | |
| 5,929,834 A | 7/1999 | Inoue et al. | |

| | | |
|---|---|---|
| 5,933,134 A | 8/1999 | Shieh |
| 5,940,055 A | 8/1999 | Lee |
| 5,940,064 A | 8/1999 | Kai et al. |
| 5,942,733 A | 8/1999 | Allen et al. |
| 5,943,043 A | 8/1999 | Furuhata et al. |
| 5,943,044 A | 8/1999 | Martinelli et al. |
| 5,945,980 A | 8/1999 | Moissev et al. |
| 5,952,998 A | 9/1999 | Clancy et al. |
| 5,955,198 A | 9/1999 | Hashimoto et al. |
| 5,982,352 A | 11/1999 | Pryor |
| 6,002,389 A | 12/1999 | Kasser |
| 6,002,808 A | 12/1999 | Freeman |
| 6,008,800 A | 12/1999 | Pryor |
| 6,020,881 A | 2/2000 | Naughton et al. |
| 6,020,945 A | 2/2000 | Sawai et al. |
| 6,023,265 A | 2/2000 | Lee |
| 6,028,581 A | 2/2000 | Umeya |
| 6,029,214 A | 2/2000 | Dorfman et al. |
| 6,031,524 A | 2/2000 | Kunert |
| 6,037,882 A | 3/2000 | Levy |
| 6,050,825 A | 4/2000 | Nichol et al. |
| 6,052,339 A | 4/2000 | Frenkel et al. |
| 6,057,903 A | 5/2000 | Colgan et al. |
| 6,061,177 A | 5/2000 | Fujimoto |
| 6,072,494 A | 6/2000 | Nguyen |
| 6,081,259 A | 6/2000 | Teterwak |
| 6,084,576 A | 7/2000 | Leu et al. |
| 6,107,654 A | 8/2000 | Yamazaki |
| 6,107,997 A | 8/2000 | Ure |
| 6,124,848 A | 9/2000 | Ballare et al. |
| 6,128,003 A | 10/2000 | Smith et al. |
| 6,131,299 A | 10/2000 | Raab et al. |
| 6,135,958 A | 10/2000 | Mikula-Curtis et al. |
| 6,137,427 A | 10/2000 | Binstead |
| 6,144,380 A | 11/2000 | Shwarts et al. |
| 6,163,313 A | 12/2000 | Aroyan et al. |
| 6,172,667 B1 | 1/2001 | Sayag |
| 6,177,918 B1 | 1/2001 | Colgan et al. |
| 6,188,391 B1 | 2/2001 | Seely et al. |
| 6,191,828 B1 | 2/2001 | Kim et al. |
| 6,198,515 B1 | 3/2001 | Cole |
| 6,204,897 B1 | 3/2001 | Colgan et al. |
| 6,208,329 B1 | 3/2001 | Ballare |
| 6,211,585 B1 | 4/2001 | Sato et al. |
| 6,222,465 B1 | 4/2001 | Kumar et al. |
| 6,239,389 B1 | 5/2001 | Allen et al. |
| 6,239,788 B1 | 5/2001 | Nohno et al. |
| 6,239,790 B1 | 5/2001 | Martinelli et al. |
| 6,243,071 B1 | 6/2001 | Shwarts et al. |
| 6,246,862 B1 | 6/2001 | Grivas et al. |
| 6,249,606 B1 | 6/2001 | Kiraly et al. |
| 6,259,490 B1 | 7/2001 | Colgan et al. |
| 6,271,835 B1 | 8/2001 | Hoeksma |
| 6,285,428 B1 | 9/2001 | Kim et al. |
| 6,288,707 B1 | 9/2001 | Philipp |
| 6,289,326 B1 | 9/2001 | LaFleur |
| 6,292,178 B1 | 9/2001 | Bernstein et al. |
| 6,297,811 B1 | 10/2001 | Kent et al. |
| 6,310,610 B1 | 10/2001 | Beaton et al. |
| 6,323,846 B1 | 11/2001 | Westerman et al. |
| 6,323,849 B1 | 11/2001 | He et al. |
| 6,337,678 B1 | 1/2002 | Fish |
| 6,342,938 B1 | 1/2002 | Song et al. |
| 6,347,290 B1 | 2/2002 | Bartlett |
| 6,377,009 B1 | 4/2002 | Philipp et al. |
| 6,380,931 B1 | 4/2002 | Gillespie et al. |
| 6,411,287 B1 | 6/2002 | Scharff et al. |
| 6,414,671 B1 | 7/2002 | Gillespie et al. |
| 6,417,846 B1 | 7/2002 | Lee |
| 6,421,039 B1 | 7/2002 | Moon et al. |
| 6,421,234 B1 | 7/2002 | Ricks et al. |
| 6,425,289 B1 | 7/2002 | Igel et al. |
| 6,452,514 B1 | 9/2002 | Philipp et al. |
| 6,457,355 B1 | 10/2002 | Philipp et al. |
| 6,459,424 B1 | 10/2002 | Resman |
| 6,466,036 B1 | 10/2002 | Philipp et al. |
| 6,483,498 B1 | 11/2002 | Colgan et al. |
| 6,501,528 B1 | 12/2002 | Hamada |
| 6,501,529 B1 | 12/2002 | Kurihara et al. |
| 6,504,530 B1 | 1/2003 | Wilson et al. |
| 6,504,713 B1 | 1/2003 | Pandolfi et al. |
| 6,515,669 B1 | 2/2003 | Mohri |
| 6,522,772 B1 | 2/2003 | Morrison et al. |
| 6,525,547 B2 | 2/2003 | Hayes |
| 6,525,749 B1 | 2/2003 | Moran et al. |
| 6,535,200 B2 | 3/2003 | Philipp |
| 6,543,684 B1 | 4/2003 | White et al. |
| 6,543,947 B2 | 4/2003 | Lee et al. |
| 6,549,193 B1 | 4/2003 | Huang et al. |
| 6,570,557 B1 | 5/2003 | Westerman et al. |
| 6,593,916 B1 | 7/2003 | Aroyan |
| 6,610,936 B2 | 8/2003 | Gillespie et al. |
| 6,624,833 B1 | 9/2003 | Kumar et al. |
| 6,624,835 B2 | 9/2003 | Willig |
| 6,628,268 B1 | 9/2003 | Harada et al. |
| 6,639,577 B2 | 10/2003 | Eberhard |
| D482,368 S | 11/2003 | Den Toonder et al. |
| 6,650,319 B1 | 11/2003 | Hurst et al. |
| 6,658,994 B1 | 12/2003 | McMillan |
| 6,670,894 B2 | 12/2003 | Mehring |
| 6,677,932 B1 | 1/2004 | Westerman |
| 6,677,934 B1 | 1/2004 | Blanchard |
| 6,680,448 B2 | 1/2004 | Kawashima et al. |
| 6,690,387 B2 | 2/2004 | Zimmerman et al. |
| 6,721,375 B1 | 4/2004 | Hammel |
| 6,723,929 B2 | 4/2004 | Kent |
| 6,724,366 B2 | 4/2004 | Crawford |
| 6,757,002 B1 | 6/2004 | Oross et al. |
| 6,762,752 B2 | 7/2004 | Perski et al. |
| 6,784,948 B2 | 8/2004 | Kawashima et al. |
| 6,785,578 B2 | 8/2004 | Johnson et al. |
| 6,803,906 B1 | 10/2004 | Morrison et al. |
| 6,825,833 B2 | 11/2004 | Mulligan et al. |
| 6,842,672 B1 | 1/2005 | Straub et al. |
| 6,846,579 B2 | 1/2005 | Anderson et al. |
| 6,856,259 B1 | 2/2005 | Sharp |
| 6,876,355 B1 | 4/2005 | Ahn et al. |
| 6,888,536 B2 | 5/2005 | Westerman et al. |
| 6,900,795 B1 | 5/2005 | Knight, III et al. |
| 6,906,692 B2 | 6/2005 | Ishiyama |
| 6,924,789 B2 | 8/2005 | Bick |
| 6,927,761 B2 | 8/2005 | Badaye et al. |
| 6,927,763 B2 | 8/2005 | LaMonica |
| 6,942,571 B1 | 9/2005 | McAllister et al. |
| 6,943,779 B2 | 9/2005 | Satoh et al. |
| 6,961,049 B2 | 11/2005 | Mulligan et al. |
| 6,965,375 B1 | 11/2005 | Gettemy et al. |
| 6,970,160 B2 | 11/2005 | Mulligan et al. |
| 6,972,401 B2 | 12/2005 | Akitt et al. |
| 6,977,666 B1 | 12/2005 | Hedrick |
| 6,982,432 B2 | 1/2006 | Umemoto et al. |
| 6,985,801 B1 | 1/2006 | Straub et al. |
| 6,992,659 B2 | 1/2006 | Gettemy |
| 6,995,752 B2 | 2/2006 | Lu |
| 7,015,894 B2 | 3/2006 | Morohoshi |
| 7,023,427 B2 | 4/2006 | Kraus et al. |
| 7,030,860 B2 | 4/2006 | Hsu et al. |
| 7,031,228 B2 | 4/2006 | Born et al. |
| 7,038,659 B2 | 5/2006 | Rajkowski |
| 7,042,444 B2 | 5/2006 | Cok |
| 7,046,235 B2 | 5/2006 | Katoh |
| 7,088,342 B2 | 8/2006 | Rekimoto |
| 7,088,343 B2 | 8/2006 | Smith |
| 7,098,127 B2 | 8/2006 | Ito |
| 7,098,897 B2 | 8/2006 | Vakil et al. |
| 7,109,978 B2 | 9/2006 | Gillespie et al. |
| 7,129,935 B2 | 10/2006 | Mackey |
| 7,133,032 B2 | 11/2006 | Cok |
| 7,138,984 B1 | 11/2006 | Miles |
| 7,151,528 B2 | 12/2006 | Taylor et al. |
| 7,154,481 B2 | 12/2006 | Cross et al. |
| 7,177,001 B2 | 2/2007 | Lee |
| 7,184,064 B2 | 2/2007 | Zimmerman et al. |
| 7,190,416 B2 | 3/2007 | Paukshto et al. |
| 7,202,856 B2 | 4/2007 | Cok |
| 7,230,608 B2 | 6/2007 | Cok |
| 7,254,775 B2 | 8/2007 | Geaghan et al. |
| 7,268,770 B1 | 9/2007 | Takahata et al. |

| | | | | | | |
|---|---|---|---|---|---|---|
| 7,274,353 | B2 | 9/2007 | Chiu et al. | 2004/0155871 A1 | 8/2004 | Perski et al. |
| 7,280,167 | B2 | 10/2007 | Choi et al. | 2004/0155991 A1 | 8/2004 | Lowles et al. |
| 7,292,229 | B2 | 11/2007 | Morag et al. | 2004/0188150 A1 | 9/2004 | Richard et al. |
| 7,307,231 | B2 | 12/2007 | Matsumoto et al. | 2004/0189587 A1 | 9/2004 | Jung et al. |
| RE40,153 | E | 3/2008 | Westerman et al. | 2004/0189612 A1 | 9/2004 | Bottari et al. |
| 7,339,579 | B2 | 3/2008 | Richter et al. | 2004/0217945 A1 | 11/2004 | Miyamoto et al. |
| 7,355,592 | B2 | 4/2008 | Jong et al. | 2004/0227736 A1 | 11/2004 | Kamrath et al. |
| 7,362,313 | B2 | 4/2008 | Geaghan et al. | 2004/0239650 A1 | 12/2004 | Mackey |
| 7,372,455 | B2 | 5/2008 | Perski et al. | 2004/0243747 A1 | 12/2004 | Rekimoto |
| 7,379,054 | B2 | 5/2008 | Lee | 2004/0263484 A1 | 12/2004 | Mantysalo et al. |
| 7,453,444 | B2 | 11/2008 | Geaghan | 2005/0007349 A1 | 1/2005 | Vakil et al. |
| 7,463,246 | B2 | 12/2008 | Mackey | 2005/0012723 A1 | 1/2005 | Pallakoff |
| 7,483,016 | B1 | 1/2009 | Gettemy et al. | 2005/0017737 A1 | 1/2005 | Yakabe et al. |
| 7,554,624 | B2 | 6/2009 | Kusuda et al. | 2005/0046621 A1 | 3/2005 | Kaikuranta |
| 7,633,484 | B2 | 12/2009 | Ito | 2005/0052425 A1 | 3/2005 | Zadesky et al. |
| 7,663,607 | B2 | 2/2010 | Hotelling et al. | 2005/0052427 A1 | 3/2005 | Wu et al. |
| 7,688,315 | B1 | 3/2010 | Gettemy et al. | 2005/0052582 A1 | 3/2005 | Mai |
| 7,705,834 | B2 | 4/2010 | Swedin | 2005/0062620 A1 | 3/2005 | Schaefer |
| 7,730,401 | B2 | 6/2010 | Gillespie et al. | 2005/0073507 A1 | 4/2005 | Richter et al. |
| 7,746,326 | B2 | 6/2010 | Sato | 2005/0083307 A1 | 4/2005 | Aufderheide et al. |
| 7,800,589 | B2 | 9/2010 | Hurst et al. | 2005/0099402 A1 | 5/2005 | Nakanishi et al. |
| 7,812,828 | B2 | 10/2010 | Westerman et al. | 2005/0104867 A1 | 5/2005 | Westerman et al. |
| 7,843,439 | B2 | 11/2010 | Perski et al. | 2005/0110768 A1 | 5/2005 | Marriott et al. |
| 7,920,129 | B2 | 4/2011 | Hotelling et al. | 2005/0146511 A1 | 7/2005 | Hill et al. |
| 8,125,463 | B2 | 2/2012 | Hotelling et al. | 2005/0162402 A1* | 7/2005 | Watanachote ................ 345/173 |
| 8,243,027 | B2 | 8/2012 | Hotelling et al. | 2005/0170668 A1 | 8/2005 | Park et al. |
| 8,259,078 | B2 | 9/2012 | Hotelling et al. | 2005/0231487 A1 | 10/2005 | Ming |
| 8,416,209 | B2 | 4/2013 | Hotelling et al. | 2005/0237439 A1 | 10/2005 | Mai |
| 8,432,371 | B2 | 4/2013 | Hotelling et al. | 2005/0243023 A1 | 11/2005 | Reddy et al. |
| 2001/0000961 | A1 | 5/2001 | Hikida et al. | 2006/0007087 A1 | 1/2006 | Choi et al. |
| 2001/0020578 | A1 | 9/2001 | Baier | 2006/0007165 A1 | 1/2006 | Yang et al. |
| 2001/0020986 | A1 | 9/2001 | Ikeda et al. | 2006/0012575 A1 | 1/2006 | Knapp et al. |
| 2001/0020987 | A1 | 9/2001 | Ahn et al. | 2006/0017710 A1 | 1/2006 | Lee et al. |
| 2002/0015024 | A1 | 2/2002 | Westerman et al. | 2006/0022955 A1 | 2/2006 | Kennedy |
| 2002/0049070 | A1 | 4/2002 | Bick | 2006/0022956 A1 | 2/2006 | Lengeling et al. |
| 2002/0084922 | A1 | 7/2002 | Yagi | 2006/0026521 A1 | 2/2006 | Hotelling et al. |
| 2002/0089496 | A1 | 7/2002 | Numao | 2006/0026535 A1 | 2/2006 | Hotelling et al. |
| 2002/0101410 | A1 | 8/2002 | Sakata et al. | 2006/0026536 A1 | 2/2006 | Hotelling et al. |
| 2002/0118848 | A1 | 8/2002 | Karpenstein | 2006/0032680 A1 | 2/2006 | Elias et al. |
| 2002/0140649 | A1 | 10/2002 | Aoyama et al. | 2006/0033724 A1 | 2/2006 | Chaudhri et al. |
| 2002/0159015 | A1 | 10/2002 | Seo et al. | 2006/0044259 A1 | 3/2006 | Hotelling et al. |
| 2002/0167489 | A1 | 11/2002 | Davis | 2006/0053387 A1 | 3/2006 | Ording |
| 2002/0185981 | A1 | 12/2002 | Dietz et al. | 2006/0066582 A1 | 3/2006 | Lyon et al. |
| 2002/0185999 | A1 | 12/2002 | Tajima et al. | 2006/0085757 A1 | 4/2006 | Andre et al. |
| 2002/0186210 | A1 | 12/2002 | Itoh | 2006/0097991 A1 | 5/2006 | Hotelling et al. |
| 2002/0190964 | A1 | 12/2002 | Van Berkel | 2006/0109222 A1 | 5/2006 | Lee et al. |
| 2002/0191029 | A1 | 12/2002 | Gillespie et al. | 2006/0132462 A1 | 6/2006 | Geaghan |
| 2002/0192445 | A1 | 12/2002 | Ezzell et al. | 2006/0145365 A1 | 7/2006 | Halls et al. |
| 2002/0196237 | A1 | 12/2002 | Fernando et al. | 2006/0145983 A1 | 7/2006 | Lee et al. |
| 2003/0006974 | A1 | 1/2003 | Clough et al. | 2006/0146033 A1 | 7/2006 | Chen et al. |
| 2003/0035479 | A1 | 2/2003 | Kan et al. | 2006/0146034 A1 | 7/2006 | Chen et al. |
| 2003/0067451 | A1* | 4/2003 | Tagg et al. .................... 345/174 | 2006/0197753 A1 | 9/2006 | Hotelling |
| 2003/0069653 | A1 | 4/2003 | Johnson et al. | 2006/0227114 A1 | 10/2006 | Geaghan et al. |
| 2003/0076301 | A1 | 4/2003 | Tsuk et al. | 2006/0232564 A1 | 10/2006 | Nishimura et al. |
| 2003/0076303 | A1 | 4/2003 | Huppi | 2006/0232567 A1 | 10/2006 | Westerman et al. |
| 2003/0076306 | A1 | 4/2003 | Zadesky et al. | 2006/0238517 A1 | 10/2006 | King et al. |
| 2003/0085882 | A1 | 5/2003 | Lu | 2006/0238518 A1 | 10/2006 | Westerman et al. |
| 2003/0095095 | A1 | 5/2003 | Pihlaja | 2006/0238519 A1 | 10/2006 | Westerman et al. |
| 2003/0095096 | A1 | 5/2003 | Robbin et al. | 2006/0238520 A1 | 10/2006 | Westerman et al. |
| 2003/0098858 | A1 | 5/2003 | Perski et al. | 2006/0238521 A1 | 10/2006 | Westerman et al. |
| 2003/0151600 | A1 | 8/2003 | Takeuchi et al. | 2006/0238522 A1 | 10/2006 | Westerman et al. |
| 2003/0174128 | A1 | 9/2003 | Matsufusa | 2006/0244736 A1 | 11/2006 | Tseng |
| 2003/0179323 | A1 | 9/2003 | Abileah et al. | 2006/0278444 A1 | 12/2006 | Binstead |
| 2003/0201984 | A1 | 10/2003 | Falvo | 2006/0290863 A1 | 12/2006 | HoeSup |
| 2003/0206162 | A1 | 11/2003 | Roberts | 2007/0013678 A1 | 1/2007 | Nakajima et al. |
| 2003/0206202 | A1 | 11/2003 | Moriya | 2007/0018969 A1 | 1/2007 | Chen et al. |
| 2003/0222857 | A1 | 12/2003 | Abileah | 2007/0027932 A1 | 2/2007 | Thibeault |
| 2003/0234768 | A1 | 12/2003 | Rekimoto et al. | 2007/0062739 A1 | 3/2007 | Philipp et al. |
| 2003/0234769 | A1 | 12/2003 | Cross et al. | 2007/0075977 A1 | 4/2007 | Chen et al. |
| 2003/0234770 | A1 | 12/2003 | MacKey | 2007/0085838 A1 | 4/2007 | Ricks et al. |
| 2004/0022010 | A1 | 2/2004 | Shigetaka | 2007/0109274 A1* | 5/2007 | Reynolds ...................... 345/173 |
| 2004/0056839 | A1 | 3/2004 | Yoshihara | 2007/0152976 A1 | 7/2007 | Townsend et al. |
| 2004/0080501 | A1 | 4/2004 | Koyama | 2007/0159561 A1 | 7/2007 | Chien |
| 2004/0090429 | A1 | 5/2004 | Geaghan et al. | 2007/0176905 A1 | 8/2007 | Shih et al. |
| 2004/0095335 | A1 | 5/2004 | Oh et al. | 2007/0182706 A1 | 8/2007 | Cassidy et al. |
| 2004/0109097 | A1 | 6/2004 | Mai | 2007/0216657 A1 | 9/2007 | Konieck |
| 2004/0119701 | A1 | 6/2004 | Mulligan et al. | 2007/0229464 A1 | 10/2007 | Hotelling et al. |
| 2004/0141096 | A1 | 7/2004 | Mai | 2007/0236466 A1 | 10/2007 | Hotelling |
| 2004/0150629 | A1 | 8/2004 | Lee | 2007/0247429 A1 | 10/2007 | Westerman |

| | | | | | | | |
|---|---|---|---|---|---|---|---|
| 2007/0257890 | A1 | 11/2007 | Hotelling et al. | JP | 59-214941 A | | 12/1984 |
| 2007/0262967 | A1 | 11/2007 | Rho | JP | 60-123927 A | | 7/1985 |
| 2008/0048994 | A1 | 2/2008 | Lee et al. | JP | 60-211529 A | | 10/1985 |
| 2008/0055221 | A1 | 3/2008 | Yabuta et al. | JP | 61-131314 A | | 6/1986 |
| 2008/0055268 | A1 | 3/2008 | Yoo et al. | JP | 63-279316 A | | 11/1988 |
| 2008/0055270 | A1 | 3/2008 | Cho et al. | JP | 02-030024 A | | 1/1990 |
| 2008/0062139 | A1 | 3/2008 | Hotelling et al. | JP | 3-180922 A | | 8/1991 |
| 2008/0062140 | A1 | 3/2008 | Hotelling et al. | JP | 4-127314 A | | 4/1992 |
| 2008/0062147 | A1 | 3/2008 | Hotelling et al. | JP | 5-080923 A | | 4/1993 |
| 2008/0062148 | A1 | 3/2008 | Hotelling et al. | JP | 5-224818 A | | 9/1993 |
| 2008/0067528 | A1 | 3/2008 | Choi et al. | JP | 6-161661 A | | 6/1994 |
| 2008/0074401 | A1 | 3/2008 | Chung et al. | JP | 07-036017 A | | 2/1995 |
| 2008/0079697 | A1 | 4/2008 | Lee et al. | JP | 7-110741 A | | 4/1995 |
| 2008/0129898 | A1 | 6/2008 | Moon | JP | 07-141086 A | | 6/1995 |
| 2008/0131624 | A1 | 6/2008 | Egami et al. | JP | 08-016307 A | | 1/1996 |
| 2008/0136980 | A1 | 6/2008 | Rho et al. | JP | 08-147092 A | | 6/1996 |
| 2008/0150901 | A1 | 6/2008 | Lowles et al. | JP | 08-297267 A | | 11/1996 |
| 2008/0158167 | A1 | 7/2008 | Hotelling et al. | JP | 09-054650 A | | 2/1997 |
| 2008/0158181 | A1 | 7/2008 | Hamblin et al. | JP | 09-096792 A | | 4/1997 |
| 2008/0165158 | A1 | 7/2008 | Hotelling et al. | JP | 09-212302 A | | 8/1997 |
| 2008/0186288 | A1 | 8/2008 | Chang | JP | 09-292950 A | | 11/1997 |
| 2009/0066670 | A1 | 3/2009 | Hotelling et al. | JP | 10-003349 A | | 1/1998 |
| 2009/0096757 | A1 | 4/2009 | Hotelling et al. | JP | 11-505641 A | | 5/1999 |
| 2009/0096758 | A1 | 4/2009 | Hotelling et al. | JP | 2000-105670 A | | 4/2000 |
| 2009/0115743 | A1 | 5/2009 | Oowaki | JP | 2000-112642 A | | 4/2000 |
| 2009/0160816 | A1 | 6/2009 | Westerman et al. | JP | 2000-163031 A | | 6/2000 |
| 2009/0273581 | A1 | 11/2009 | Kim et al. | JP | 2000-172437 A | | 6/2000 |
| 2009/0303193 | A1 | 12/2009 | Lim et al. | JP | 2000-172447 A | | 6/2000 |
| 2010/0103121 | A1 | 4/2010 | Kim et al. | JP | 2000-221932 A | | 8/2000 |
| 2010/0188347 | A1 | 7/2010 | Mizuhashi et al. | JP | 2002-501271 A | | 1/2002 |
| 2010/0194699 | A1 | 8/2010 | Chang | JP | 2002-259052 A | | 9/2002 |
| 2010/0238134 | A1 | 9/2010 | Day et al. | JP | 2002-287660 A | | 10/2002 |
| 2010/0289770 | A1 | 11/2010 | Lee et al. | JP | 2002-342014 A | | 11/2002 |
| 2011/0187677 | A1 | 8/2011 | Hotelling | JP | 2002-342033 A | | 11/2002 |
| 2012/0105371 | A1 | 5/2012 | Hotelling et al. | JP | 2002-366304 A | | 12/2002 |
| 2012/0162104 | A1 | 6/2012 | Chang | JP | 2003-029899 A | | 1/2003 |
| 2012/0162584 | A1 | 6/2012 | Chang | JP | 2003-099192 A | | 4/2003 |

FOREIGN PATENT DOCUMENTS

| | | | | | | |
|---|---|---|---|---|---|---|
| DE | 197 06 168 A1 | 8/1998 | JP | 2003-185688 A | | 7/2003 |
| DE | 102 51 296 A1 | 5/2004 | JP | 2003-196023 A | | 7/2003 |
| EP | 0 156 593 A2 | 10/1985 | JP | 2003-255855 A | | 9/2003 |
| EP | 0 156 593 A3 | 10/1985 | JP | 2004-102985 A | | 4/2004 |
| EP | 0 250 931 A2 | 1/1988 | JP | 2004-186333 A | | 7/2004 |
| EP | 0 250 931 A3 | 1/1988 | JP | 2005-346047 A | | 12/2005 |
| EP | 0 250 931 B1 | 1/1988 | JP | 2007-533044 T | | 11/2007 |
| EP | 0 288 692 A2 | 11/1988 | JP | 2008-032756 A | | 2/2008 |
| EP | 0 288 692 A3 | 11/1988 | KR | 10-0226812 B1 | | 7/1999 |
| EP | 0 288 692 B1 | 11/1988 | KR | 10-2004-0002310 A | | 1/2004 |
| EP | 0 464 908 A2 | 1/1992 | KR | 10-2004-0013029 A | | 2/2004 |
| EP | 0 464 908 A3 | 1/1992 | KR | 10-2005-0019799 A | | 3/2005 |
| EP | 0 464 908 B1 | 1/1992 | KR | 10-2006-0089645 A | | 8/2006 |
| EP | 0 664 504 A2 | 7/1995 | TW | 200302778 A | | 8/2003 |
| EP | 0 786 745 A2 | 7/1997 | TW | 200529441 A | | 9/2005 |
| EP | 0 786 745 A3 | 7/1997 | WO | WO-87/04553 A1 | | 7/1987 |
| EP | 0 786 745 B1 | 7/1997 | WO | WO-92/13328 A1 | | 8/1992 |
| EP | 0 932 117 A2 | 7/1999 | WO | WO-96/15464 A1 | | 5/1996 |
| EP | 0 932 117 A3 | 7/1999 | WO | WO-96/18179 A1 | | 6/1996 |
| EP | 0 932 117 B1 | 7/1999 | WO | WO-97/18547 A1 | | 5/1997 |
| EP | 0 973 123 A1 | 1/2000 | WO | WO-97/23738 A1 | | 7/1997 |
| EP | 1 014 295 A2 | 6/2000 | WO | WO-98/14863 A1 | | 4/1998 |
| EP | 1 014 295 A3 | 6/2000 | WO | WO-99/38149 A1 | | 7/1999 |
| EP | 1 211 633 A1 | 6/2002 | WO | WO-01/27868 A1 | | 4/2001 |
| EP | 1 211 633 B1 | 6/2002 | WO | WO-03/079176 A2 | | 9/2003 |
| EP | 1 322 104 A1 | 6/2003 | WO | WO-03/088176 A1 | | 10/2003 |
| EP | 1 391 807 A1 | 2/2004 | WO | WO-2004/013833 A2 | | 2/2004 |
| EP | 1 396 812 A2 | 3/2004 | WO | WO-2004/013833 A3 | | 2/2004 |
| EP | 1 396 812 A3 | 3/2004 | WO | WO-2004/023376 A2 | | 3/2004 |
| EP | 1 418 491 A2 | 5/2004 | WO | WO-2004/023376 A3 | | 3/2004 |
| EP | 1 418 491 A3 | 5/2004 | WO | WO-2004/053576 A1 | | 6/2004 |
| EP | 1 422 601 A1 | 5/2004 | WO | WO-2004/061808 A2 | | 7/2004 |
| EP | 1 455 264 A2 | 9/2004 | WO | WO-2004/061808 A3 | | 7/2004 |
| EP | 1 455 264 A3 | 9/2004 | WO | WO-2004/114265 A2 | | 12/2004 |
| EP | 2 267 584 A1 | 12/2010 | WO | WO-2005/064451 A1 | | 7/2005 |
| GB | 1 486 988 A | 9/1977 | WO | WO-2005/114369 A2 | | 12/2005 |
| GB | 2 168 816 A | 6/1986 | WO | WO-2005/114369 A3 | | 12/2005 |
| GB | 2 368 483 A | 7/2004 | WO | WO-2006/023569 A1 | | 3/2006 |
| JP | 53-147626 U | 11/1978 | WO | WO-2007/146779 A2 | | 12/2007 |
| JP | 58-166430 A | 10/1983 | WO | WO-2007/146779 A3 | | 12/2007 |
| | | | WO | WO-2007/146780 A2 | | 12/2007 |
| | | | WO | WO-2007/146780 A3 | | 12/2007 |

| | | | |
|---|---|---|---|
| WO | WO-2007/146783 A2 | 12/2007 |
| WO | WO-2007/146783 A3 | 12/2007 |
| WO | WO-2007/146785 A2 | 12/2007 |
| WO | WO-2007/146785 A3 | 12/2007 |
| WO | WO-2008/085457 A2 | 7/2008 |
| WO | WO-2008/085457 A3 | 7/2008 |
| WO | WO-2009/035471 A1 | 3/2009 |
| WO | WO-2012/087639 A2 | 6/2012 |

OTHER PUBLICATIONS

Non-Final Office Action mailed Jul. 8, 2011, for U.S. Appl. No. 12/267,532, filed Nov. 7, 2008, five pages.

Non-Final Office Action mailed Jul. 14, 2011, for U.S. Appl. No. 12/267,522, filed Nov. 7, 2008, six pages.

TW Search Report mailed Jun. 27, 2011, for TW Patent Application No. 097100481, one page.

Non-Final Office Action mailed Jan. 25, 2011, for U.S. Appl. No. 11/818,395, filed Jun. 13, 2007, 31 pages.

Non-Final Office Action mailed May 13, 2011, for U.S. Appl. No. 12/267,540, filed Nov. 7, 2008, seven pages.

Non-Final Office Action mailed Jun. 20, 2012, for U.S. Appl. No. 13/345,347, filed Jan. 6, 2012, five pages.

Boie, R.A. (Mar. 1984). "Capacitive Impedance Readout Tactile Image Sensor," *Proceedings of 1984 IEEE International Conference on Robotics and Automation*, pp. 370-378.

Chun, K. et al. (Jul. 1985). "A High-Performance Silicon Tactile Imager Based on a Capacitive Cell," *IEEE Transactions on Electron Devices* 32(7):1196-1201.

Krein, P. et al. (May/Jun. 1990). "The Electroquasistatics of the Capacitive Touch Panel," *IEEE Transactions on Industry Applications* 26(3):529-534.

Suzuki, K. et al. (Aug. 1990). "A 1024-Element High-Performance Silicon Tactile Imager," *IEEE Transactions on Electron Devices* 37(8):1852-1860.

Final Office Action mailed Oct. 17, 2011, for U.S. Appl. No. 11/818,395, filed Jun. 13, 2007, 16 pages.

Notice of Allowance mailed Oct. 25, 2011, for U.S. Appl. No. 12/267,540, filed Nov. 7, 2008, seven pages.

European Search Report mailed Mar. 27, 2012, for EP Application No. 10178558.2, nine pages.

European Search Report mailed Feb. 16, 2012, for EP Application No. 11183531.0, 11 pages.

3M (2002). MicroTouch Capacitive Touch Screens Datasheets, 3M Innovation, six pages.

Agrawal, R. et al. (Jul. 1986). "An Overview of Tactile Sensing," Center for Research on Integrated Manufacturing: Robot Systems Division, The University of Michigan, 47 pages.

Anonymous. (May 8, 1992). "The Sensor Frame Graphic Manipulator," *NASA Phase II Final Report*, 28 pages.

Baxter, L.K. (1996). *Capacitive Sensors: Design and Applications*, vol. 1 of IEEE Press Series on Electronics Technology, John Wiley & Sons: New York, NY, (Table of Contents Only) three pages.

Bennion, S.I. et al. (Dec. 1981). "Touch Sensitive Graphics Terminal Applied to Process Control," *Computer Graphics* 15(4):342-350.

Buxton, W.A.S. (Mar./Apr. 1994). "Combined Keyboard/Touch Tablet Input Device," *Xerox Disclosure Journal* 19(2):109-111.

Cliff (Jul. 24, 2002). "Building a Pressure-Sensitive, Multi-Point TouchScreen?" Posted from the D-I-Y-Baby Department, one page.

Dannenberg, R.B. et al. (1989). "A Gesture Based User Interface Prototyping System," *ACM*, pp. 127-132.

Davies, E.R. (Aug. 1987). "Lateral Histograms for Efficient Object Location: Speed versus Ambiguity," *Pattern Recognition Letters* 6(3):189-198.

Davies, E.R. (1997). "Boundary Pattern Analysis," Chapter 7 *in Machine Vision: Theory, Algorithms, Practicalities*, 2nd Edition, Academic Press, Inc.: San Diego, CA, pp. 171-191.

Davies, E.R. (1997). "Ellipse Detection," Chapter 11 *in Machine Vision: Theory, Algorithms, Practicalities*, 2nd Edition, Academic Press, Inc.: San Diego, CA, pp. 271-290.

Davies, E.R. (1997). "Image Acquisition," Chapter 23 *in Machine Vision: Theory, Algorithms, Practicalities*, 2nd Edition, Academic Press, Inc.: San Diego, CA, pp. 583-601.

Diaz-Marino, R.A. et al. (2003). "Programming for Multiple Touches and Multiple Users: A Toolkit for the DiamondTouch Hardware," *Proceedings of ACM UIST'03 User Interface Software and Technology*, two pages.

Dietz, P. et al. (2001). "DiamondTouch: A Multi-User Touch Technology," Proceedings of the 14th Annual ACM Symposium on User Interface Software and Technology, Nov. 11-14, 2001, Orlando, FL, pp. 219-226.

Esenther, A. et al. (Nov. 2002). "DiamondTouch SDK: Support for Multi-User, Multi-Touch Applications," *Mitsubishi Electric Research Laboratories, Inc.*, five pages.

Fearing, R.S. (Jun. 1990). "Tactile Sensing Mechanisms," *The International Journal of Robotics Research* 9(3):3-23.

Hinckley, K. et al. (1998). "Interaction and Modeling Techniques for Desktop Two-Handed Input," *Proceedings of ACM USIT'98 Symposium on User Interface Software and Technology*, pp. 49-58.

Hinckley, K. et al. (May 1999). "Touch-Sensing Input Devices," *CHI 99* pp. 223-230.

Hinckley, K. et al. (2000). "Sensing Techniques for Mobile Interaction," *CHI Letters* 2(2):91-100.

Hlady, A.M. (1969). "A Touch Sensitive X-Y Position Encoder for Computer Input," *Fall Joint Computer Conference*, pp. 545-551.

Kirk, D.E. (1970). "Numerical Determination of Optimal Trajectories," Chapter 6 *in Optimal Control Theory: An Introduction*, Prentice Hall, Inc.: Englewood Cliffs, NY. pp. 329-413, with Table of Contents, pp. vii-ix. (90 pages total).

Kling, M. et al. (Sep. 2003). "Interface Design: LCD Touch Interface for ETRAX 100LX," Thesis Submitted in Partial Fulfillment of the Requirements for the Degree of Master of Science, UMEA University, Umea, Sweden, 79 pages.

Ko, H. (Jul. 2000). "Open Systems Advanced Workstation Transition Report," Technical Report 1822, *U.S. Navy, SSC* San Diego, CA, 82 pages.

Leigh, J. et al. (2002). "Amplified Collaboration Environments," *VizGrid Symposium*, Nov. 2002, Tokyo, Japan, nine pages.

Ljungstrand, P. et al. eds. (2002). UBICOMP2002, Adjunct Proceedings, 4th *International Conference on Ubiquitous Computing*, Sep. 29-Oct. 1, 2002, Goteborg, Sweden, 90 pages.

Magerkurth, C. et al. (2004). "Towards the Next Generation of Tabletop Gaming Experiences," *Graphics Interface 2004 (GI'04)*, May 17-19, 2004, Ontario, Canada, pp. 1-8.

Matsushita, N. et al. (2000). "Dual Touch: A Two-Handed Interface for Pen-Based PDAs," *CHI Letters* 2(2):211-212.

McMillan, G.R. (Oct. 1998). "The Technology and Applications of Gesture-Based Control," *presented at the RTO Lecture Series on Alternative Control Technologies: Human Factor Issues*, Oct. 14-15, 1998, Ohio, USA, pp. 4-1-4-11.

Mehta, N. et al. (May 1982). "Feature Extraction as a Tool for Computer Input," *Proceedings of ICASSP '82*, May 3-5, 1982, Paris, France, pp. 818-820.

Mitchell, G. D. (Oct. 2003). "Orientation on Tabletop Displays," Thesis Submitted in Partial Fulfillment of the Requirements for the Degree of Master of Science, Simon Fraser University, 119 pages.

Noda, K. et al. (2001). "Production of Transparent Conductive Films with Inserted $SiO_2$ Anchor Layer, and Application to a Resistive Touch Panel," *Electronics and Communications in Japan* Part 2 84(7):39-45.

Ogawa, H. et al. (1979). "Preprocessing for Chinese Character Recognition and Global Classification of Handwritten Chinese Characters," *Pattern Recognition* 11:1-7.

Phipps, C.A. (Spring 2003). "A Metric to Measure Whole Keyboard Index of Difficulty Based on Fitts' Law," A Dissertation Submitted in Partial Fulfillment of the Requirements for the Degree of Ph.D., 103 pages.

Quantum Research Group Ltd. (1999). QProx™ QT60320 32-Key Qmatrix™ Charge-Transfer IC Datasheet, pp. 1-14.

Quantum Research Group Ltd. (2001). QT60325, QT60485, QT60645 32, 48, 64 Key QMatrix™ Keypanel Sensor Ics Datasheet, 42 pages.

Quantum Research Group Ltd. (2002). QMatrix™ QT60040 4-Key Charge-Transfer IC Datasheet, pp. 1-9.

Quantum Research Group Ltd. (Oct. 10, 2002). Quantum Research Application Note AN-KD01: Qmatrix™ Panel Design Guidelines, four pages.

Rabuffetti, M. (2002). "Touch-screen System for Assessing Visuomotor Exploratory Skills in Neuropsychological Disorders of Spatial Cognition," *Medical & Biological Engineering & Computing* 40:675-686.

Raisamo, R. (Dec. 7, 1999). "Multimodal Human-Computer Interaction: A Constructive and Empirical Study," Dissertation, University of Tampere, Finland, 86 pages.

Rekimoto, J. et al. (2003). "Pre-Sense: Interaction Techniques for Finger Sensing Input Devices," *CHI Letters* 5(2):203-212.

Rubine, D. (Jul. 1991). "Specifying Gestures by Example," *Computer Graphics* 25(4):329-337.

Rubine, D. et al. (1988). "The VideoHarp," *Proceedings of the 14th International Computer Music Conference*, Cologne, W. Germany, Sep. 20-25, 1988, pp. 49-55.

Rubine, D. et al. (1991). "The Videoharp: An Optical Scanning MIDI Controller," *Contemporary Music Review* 6(1):31-46.

Russell, D.M. et al. (2004). "The Use Patterns of Large, Interactive Display Surfaces: Case Studies of Media Design and use for BlueBoard and MERBoard," *Proceedings of the 37th Hawaii International Conference on System Sciences 2004*, IEEE, pp. 1-10.

Sears, A. (Mar. 11, 1991). "Improving Touchscreen Keyboards: Design Issues and a Comparison with Other Devices," *Human-Computer Interaction Laboratory*, pp. 1-19.

Sears, A. et al. (Jun. 1990). "A New Era for High-Precision Touchscreens," *Advances in Human-Computer Interaction*, vol. 3, Tech Report HCIL-90-01, one page only.

Segen, J. et al. (1998). "Human-Computer Interaction Using Gesture Recognition and 3D Hand Tracking," *IEEE*, pp. 188-192.

Shen, C. et al. (Jan. 2004). "DiamondSpin: An Extensible Toolkit for Around-the-Table Interaction," *CHI 2004*, Apr. 24-29, 2004, Vienna, Austria, 10 pgs.

Siegel, D.M. et al. (1987). "Performance Analysis of a Tactile Sensor," *IEEE*, pp. 1493-1499.

Son, J.S. et al. (1996). "Comparison of Contact Sensor Localization Abilities During Manipulation," *Robotics and Autonomous System* 17 pp. 217-233.

Stansfield, S.A. (Mar. 1990). "Haptic Perception With an Articulated, Sensate Robot Hand," *SANDIA Report*: SAND90-0085-UC-406, 37 pages.

Stauffer, R.N. ed. (Jun. 1983). "Progress in Tactile Sensor Development," *Robotics Today* pp. 43-49.

Stumpe, B. (Mar. 16, 1977). "A New Principle for an X-Y Touch Screen," *CERN*, 19 pages.

Stumpe, B. (Feb. 6, 1978). "Experiments to Find a Manufacturing Process for an X-Y Touch Screen: Report on a Visit to Polymer-Physik GmbH," *CERN*, five pages.

Sugiyama, S. et al. (Mar. 1990). "Tactile Image Detection Using a 1k-element Silicon Pressure Sensor Array," *Sensors and Actuators* A21-A23(1-3):397-400.

U.S. Appl. No. 60/072,509, filed Jan. 26, 1998, by Westerman et al.

U.S. Appl. No. 60/333,770, filed Nov. 29, 2001, by Perski et al.

U.S. Appl. No. 60/501,484, filed Sep. 5, 2003, by Perski et al.

Van Kleek, M. (Feb. 2003). "Intelligent Environments for Informal Public Spaces: The Ki/o Kiosk Platform," Thesis Submitted in Partial Fulfillment of the Requirements for the Degree of Master of Engineering, MIT, 108 pages.

Van Oversteegen, B.G.F.A.W. (Apr. 10, 1998). "Touch Screen Based Measuring Equipment: Design and Implementation," Master's Thesis, Submitted to Technische Universiteit, Eindhoven, The Nederlands, 103 pages.

Vazquez, A.A. (Sep. 1990). "Touch Screen Use on Flight Simulator Instructor/Operator Stations," Thesis Submitted in Partial Fulfillment of the Requirements for the Degree of Master of Science in Information Systems, 78 pages.

Wacom Company Limited. (Nov. 12, 2003). Wacom intuos® 2 User's Manual for Windows®, English V4.1, 165 pages.

Wallergard, M. (2003). "Designing Virtual Environments for Brain Injury Rehabilitation," Thesis, Lund University, Sweden, 98 pages.

Wu, M. et al. (2003). "Multi-Finger and Whole Hand Gestural Interaction Techniques for Multi-User Tabletop Displays," *ACM* pp. 193-202.

Anonymous. (Oct. 30, 2001). "Radiotelephone with Rotating Symbol Keypad and Multi-Directional Symbol Input,"located at www.vitgn.com/mobile_terminal.com, 12 pages.

Collberg, C. et al. (2002). "TetraTetris: A Study of Multi-User Touch-Based Interaction Using DiamondTouch," located at cs.arizona.edu, eight pages.

Davies, E.R. (1990). *Machine Vision: Theory, Algorithms, Practicalities*, Academic Press, Inc.: San Diego, CA, pp. xi-xxi (Table of Contents Only.).

Krueger, M. et al. (Jun. 10, 1988). "Videoplace, Responsive Environment, 1972-1990," located at http://www.youtube.com/watch?v=dmmxVA5xhuo, last visited Aug. 5, 2011, two pages.

Malik, S. et al. (2004). "Visual Touchpad: A Two-Handed Gestural Input Device," *ICMI'04 Proceedings of the 6th International Conference on Multimodal Intercases, ACM*, 8 pages.

Quantum Research Group Ltd.(1997). QT9701 B2 Datasheet, 30 pages.

Rong, J. et al. (2002). "AIAA 2002-4553: Hierarchical Agent Based System for General Aviation CD&R Under Free Flight," *AIAA Guidance, Navigation, and Control Conference and Exhibit*, Aug. 5-8, 2002, Monterey, CA, pp. 1-11.

Vernier, F. et al. (2002). "Multi-User, Multi-Finger Drag & Drop of Multiple Documents," located at http://www.edgelab.ca/CSCW/Workshop2002/fred_vernier, three pages.

Westerman, W. et al. (2001). "Multi-Touch: A New Tactile 2-D Gesture Interface for Human-Computer Interaction," *Proceedings of the Human Factors and Ergonomics Societ 45th Annual Meeting*, pp. 632-636.

Yee, K-P. (2004). "Two-Handed Interaction on a Tablet Display,"CHI'04, pp. 1493-1496.

European Search Report mailed Jul. 28, 2011, for EP Application No. 11159164.0, filed Jun. 8, 2007, eight pages.

European Search Report mailed Oct. 21, 2011, for EP Application No. 11159166.5, filed Jun. 8, 2007, seven pages.

Final Office Action mailed Jul. 6, 2010, for U.S. Appl. No. 11/760,036, filed Jun. 8, 2007, 51 pages.

Final Office Action mailed Jul. 6, 2010, for U.S. Appl. No. 11/760,080, filed Jun. 8, 2007, 66 pages.

Final Office Action mailed Jul. 22, 2010, for U.S. Appl. No. 11/760,049, filed Jun. 8, 2007, 52 pages.

Final Office Action mailed Aug. 2, 2010, for U.S. Appl. No. 11/760,060, filed Jun. 8, 2007, 78 pages.

Final Office Action mailed Dec. 16, 2011, for U.S. Appl. No. 11/760,036, filed Jun. 8, 2007, 53 pages.

Final Office Action mailed Jan. 30, 2012, for U.S. Appl. No. 11/760,049, filed Jun. 8, 2007, 64 pages.

Final Office Action mailed Feb. 27, 2012, for U.S. Appl. No. 11/760,080, filed Jun. 8, 2007, 62 pages.

Hector, J. et al. (May 2002). "Low Power Driving Options for an AMLCD Mobile Display Chipset," Chapter 16.3 in *SID 02 Digest* (2002 SID International Symposium, Digest of Technical Papers), XXXIII(II):694-697.

International Search Report mailed Mar. 6, 2008, for PCT Application No. PCT/2007/70733, filed Jun. 8, 2007, five pages.

International Search Report mailed Mar. 7, 2008, for PCT Application No. PCT/2007/70722, filed Jun. 8, 2007, three pages.

International Search Report mailed Jul. 18, 2008, for PCT Application No. PCT/2007/70725, filed Jun. 8, 2007, six pages.

International Search Report mailed Jul. 18, 2008, for PCT Application No. PCT/2007/70729, filed Jun. 8, 2007, five pages.

International Search Report mailed Jun. 15, 2012, for PCT/US2011/064455, filed Dec. 12, 2011, four pages.

Kanda, E. et al. (2008). "55.2: Integrated Active Matrix Capacitive Sensors for Touch Panel LTPS-TFT LCDs," *SID 08 Digest*, pp. 834-837.

Non-Final Office Action mailed Mar. 12, 2010, for U.S. Appl. No. 11/760,080, filed Jun. 8, 2007, 31 pages.

Non-Final Office Action mailed Apr. 22, 2010, for U.S. Appl. No. 11/760,036, filed Jun. 8, 2007, 37 pages.

Non-Final Office Action mailed Apr. 23, 2010, for U.S. Appl. No. 11/760,060, filed Jun. 8, 2007, 66 pages.
Non-Final Office Action mailed May 5, 2010, for U.S. Appl. No. 11/760,049, filed Jun. 8, 2007, 65 pages.
Non-Final Office Action mailed Aug. 4, 2011, for U.S. Appl. No. 11/760,036, filed Jun. 8, 2007, 45 pages.
Non-Final Office Action mailed Aug. 11, 2011, for U.S. Appl. No. 11/760,049, filed Jun. 8, 2007, 60 pages.
Non-Final Office Action mailed Sep. 1, 2011, for U.S. Appl. No. 11/760,060, filed Jun. 8, 2007, 76 pages.
Non-Final Office Action mailed Nov. 14, 2011, for U.S. Appl. No. 11/760,080, filed Jun. 8, 2007, 60 pages.
Non-Final Office Action mailed Feb. 17, 2012, for U.S. Appl. No. 13/251,099, filed Sep. 30, 2011, seven pages.
Non-Final Office Action mailed Oct. 5, 2012, for U.S. Appl. No. 12/976,997, filed Dec. 22, 2010, 6 pages.
Notice of Allowance mailed Mar. 27, 2012, for U.S. Appl. No. 11/760,060, filed Jun. 8, 2007, 17 pages.
Notice of Allowance mailed Apr. 27, 2012, for U.S. Appl. No. 11/760,036, filed Jun. 8, 2007, eight pages.
Notice of Allowance mailed Jul. 12, 2012, for U.S. Appl. No. 13/251,099, filed Sep. 30, 2011, seven pages.
Notice of Allowance mailed Sep. 19, 2012, for U.S. Appl. No. 13/345,347, filed Jan. 6, 2012, seven pages.
Notice of Allowance mailed Oct. 29, 2012, for U.S. Appl. No. 13/345,347, filed Jan. 6, 2012, eight pages.
Partial European Search Report mailed Mar. 15, 2011, for EP Application No. 10178661.4, filed Jun. 8, 2007, six pages.
Partial European Search Report mailed Oct. 21, 2011, for EP Application No. 11159165.7 filed Jun. 8, 2007, seven pages.
Partial European Search Report mailed Oct. 24, 2011, for EP Application No. 11159167.3 filed Jun. 8, 2007, eight pages.
Non-Final Office Action mailed Mar. 29, 2013, for U.S. Appl. No. 13/717,573, filed Dec. 17, 2012, five pages.
Notice of Allowance mailed Feb. 6, 2013, for U.S. Appl. No. 13/084,402, filed Apr. 11, 2011, 13 pages.
Notice of Allowance mailed Feb. 19, 2013, for U.S. Appl. No. 13/538,498, filed Jun. 29, 2012, 16 pages.
Anonymous. "4-Wire Resistive Touchscreens" obtained from http://www.touchscreens.com/intro-touchtypes-4resistive.html generated Aug. 5, 2005.
Anonymous. "5-Wire Resistive Touchscreens" obtained from http://www.touchscreens.com/intro-touchtypes-resistive.html generated Aug. 5, 2005.
Anonymous. "A Brief Overview of Gesture Recognition" obtained from http://www. Dai. Ed. Ac.uk/Cvonline/LOCA_COPIES/COHEN/gesture_overview. Html, generated Apr. 20, 2004.
Anonymous. "Capacitive Position Sensing" obtained from http://www.synaptics.com/technology/cps.cfin generated Aug. 5, 2005.
Anonymous. "Capacitive Touchscreens" obtained from http://www.touchscreens.com/intro-touchtypes-capacitive.html generated Aug. 5, 2005.
Anonymous. "Comparing Touch Technologies" obtained from http://www.touchscreens.com/intro-touchtypes.html generated Oct. 10, 2004.
Anonymous. "FingerWorks—Gesture Guide—Application Switching," obtained from http://www.fingerworks.com/gesture_guide_apps.html, generated on Aug. 27, 2004, 1-pg.
Anonymous. "FingerWorks—Gesture Guide—Editing," obtained from http://www.fingerworks.com/gesure_guide_editing.html, generated on Aug. 27, 2004, 1-pg.
Anonymous. "FingerWorks—Gesture Guide—File Operations," obtained from http://www.fingerworks.com/gesture_guide_files.htmi, generated on Aug. 27, 2004, 1-pg.
Anonymous. "FingerWorks—Gesture Guide—Text Manipulation," obtained from http://www.fingerworks.com/gesture_guide_text_manip.html, generated on Aug. 27, 2004, 2-pg.
Anonymous. "FingerWorks—Gesture Guide—Tips and Tricks," obtained from http://www.fingerworks.com/gesture_guide_tips.html, generated Aug. 27, 2004, 2 pgs.
Anonymous. "FingerWorks—Gesture Guide—Web," obtained from http://www.fingerworks.com/gesture_guide_web.html, generated on Aug. 27, 2004, 1-pg.

Anonymous. "FingerWorks—Guide to Hand Gestures for USB Touchpads," obtained from http://www.fingerworks.com/igesture_userguide.html, generated Aug. 27, 2004, 1-pg.
Anonymous. "FingerWorks—iGesture—Technical Details," obtained from http://www.fingerworks.com/igesture_tech.html, generated Aug. 27, 2004, 1-pg.
Anonymous. "FingerWorks—The Only Touchpads with Ergonomic Full-Hand Resting and Relaxation!" obtained from http://www.fingerworks.com/resting/html, Copyright 2001, 1 pg.
Anonymous. "FingerWorks—Tips for Typing on the Mini," obtained from http://www.fingerworks.com/mini_typing.html, generated on Aug. 27, 2004, 2 pgs.
Anonymous. "GlidePoint®" obtained from http://www.cirque.com/technology/technology_gp.html generated Aug. 5, 2005.
Anonymous. "Gesture Recognition" http://www.fingerworks.com/gesture_recognition.htm1>, Jul. 2, 2006.
Anonymous. "How do touchscreen monitors know where you're touching?" obtained from http://www.electronics.howstuffworks.com/question716.html generated Aug. 5, 2005.
Anonymous. "How does a touchscreen work?" obtained from http://www.touchscreens.com/intro-anatomy.html generated Aug. 5, 2005.
Anonymous. "iGesture Pad—the MultiFinger USB TouchPad with Whole-Hand Gestures,"obtained from http://www.fingerworks.com/igesture.html, generated Aug. 27, 2004, 2-pgs.
Anonymous. "iGesture Products for Everyone (learn in minutes) Product Overview"FingerWorks.com downloaded Aug. 30, 2005.
Anonymous. "Infrared Touchscreens" obtained from http://www.touchscreens.com/intro-touchtypes-infrared.html generated Aug. 5, 2005.
Anonymous. "Mouse Emulation" FingerWorks obtained from http://www.fingerworks.com/gesture_guide_mouse.html generated Aug. 30, 2005.
Anonymous. "Mouse Gestures in Opera" obtained from http://www.opera.com/products/desktop/mouse/index.dml generated Aug. 30, 2005.
Anonymous. "Mouse Gestures," Optim oz, May 21, 2004.
Anonymous. "MultiTouch Overview" FingerWorks obtained from http://www.fingerworks.com/multoverview.html generated Aug. 30, 2005.
Anonymous. "Near Field Imaging Touchscreens" obtained from http://www.touchscreens.com/intro-touchtypes-nfi.html generated Aug. 5, 2005.
Anonymous. "PenTouch Capacitive Touchscreens" obtained from http://www.touchscreens.com/intro-touchtypes-pentouch.html generated Aug. 5, 2005.
Anonymous. "Surface Acoustic Wave Touchscreens" obtained from http://www.touchscreens.com/intro-touchtypes-saw.html generated Aug. 5, 2005.
Anonymous, "Symbol Commander" obtained from http://www.sensiva.com/symbolcommander/, generated Aug. 30, 2005.
Anonymous. "Touch Technologies Overview" 2001, 3M Touch Systems, Massachusetts.
Anonymous. "Touchscreen Technology Choices," <http://www.elotouch.com/products/detech2.asp>, downloaded Aug. 5, 2005.
Anonymous. "Wacom Components—Technology" obtained from http://www.wacom-components.com/english/tech.asp generated on Oct. 10, 2004.
Anonymous. "Watershed Algorithm" http://rsb.info.nih.gov/ij/plugins/watershed.html generated Aug. 5, 2005.
Bier et al., "Toolglass and Magic Lenses: The see-through interface" In James Kijiya, editor, Computer Graphics (SIGGRAPH '93 Proceedings), vol. 27, pp. 73-80, Aug. 1993.
Douglas et al., *The Ergonomics of Computer Pointing Devices* (1997).
European Search Report received in EP 1 621 989 (@ Beyer Weaver & Thomas, LLP) dated Mar. 27, 2006.
EVB Elektronik "TSOP6238 IR Receiver Modules for Infrared Remote Control Systems" dated Jan. 2004 1-pg.
Fisher et al., "Repetitive Motion Disorders: The Design of Optimal Rate—Rest Profiles," Human Factors, 35(2):283-304 (Jun. 1993).
Fukumoto and Yoshinobu Tonomura, "Body Coupled Fingering: Wireless Wearable Keyboard," *CHI97*, pp. 147-154 (Mar. 1997).

Fukumoto et al., "ActiveClick: Tactile Feedback for Touch Panels," In CHI 2001 Summary, pp. 121-122, 2001.
Hardy, "Fingerworks" Mar. 7, 2002; BBC World on Line.
Hillier and Gerald J. Lieberman, *Introduction to Operations Research* (1986).
Hinckley et al., "Touch-Sensing Input Devices," in CHI '99 Proceedings, pp. 223-230, 1999.
International search report for International Application No. PCT/US2005/014364 mailed Jan. 12, 2005.
International Search Report dated Mar. 3, 2006 (PCT/US 05/03325; 119-0052WO).
International Search Report received in corresponding PCT application No. PCT/US2006/008349 dated Oct. 6, 2006.
International Search Report mailed Oct. 16, 2008, for PCT Application No. PCT/US2007/088749, filed Dec. 21, 2007, four pages.
Jacob et al., "Integrality and Separability of Input Devices," *ACM Transactions on Computer-Human Interaction*, 1:3-26 (Mar. 1994).
Kionx "KXP84 Series Summary Data Sheet" copyright 2005, dated Oct. 21, 2005, 4-pgs.
Lee, "A Fast Multiple-Touch-Sensitive Input Device," Master's Thesis, University of Toronto (1984).
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Matsushita et al., "HoloWall: Designing a Finger, Hand, Body and Object Sensitive Wall," In Proceedings of UIST '97, Oct. 1997.
Non-Final Office Action mailed May 14, 2008, for U.S. Appl. No. 10/840,862, filed May 6, 2004, six pages.
Non-Final Office Action mailed Dec. 24, 2008, for U.S. Appl. No. 10/840,862, filed May 6, 2004, nine pages.
Non-Final Office Action mailed Jun. 2, 2009, for U.S. Appl. No. 10/840,862, filed May 6, 2004, seven pages.
Non-Final Office Action mailed Nov. 12, 2009, for U.S. Appl. No. 10/840,862, filed May 6, 2004, eight pages.
Quantum Research Group "QT510 / Qwheel™ Touch Slider IC" copyright 2004-2005, 14-pgs.
Quek, "Unencumbered Gestural Interaction," *IEEE Multimedia*, 3:36-47 (Winter 1996).
Radwin, "Activation Force and Travel Effects on Overexertion in Repetitive Key Tapping," *Human Factors*, 39(1):130-140 (Mar. 1997).
Rekimoto et al., "ToolStone: Effective Use of the Physical Manipulation Vocabularies of Input Devices," In Proc. of UIST 2000, 2000.
Rekimoto, J. (2002). "SmartSkin: an Infrastructure for Freehand Manipulation on Interactive Surfaces," *CHI 2002*, Apr. 20-25, 2002. [(Apr. 25, 2002). 4(1):113-120.].
Rubine et al., "Programmable Finger-Tracking Instrument Controllers," *Computer Music Journal*, vol. 14, No. 1 (Spring 1990).
Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.
Rubine, D.H. (May 1992). "Combining Gestures and Direct Manipulation," CHI '92, pp. 659-660.
Rutledge et al., "Force-To-Motion Functions for Pointing," Human-Computer Interaction—Interact (1990).
Singapore Examination Report mailed Jan. 11, 2010, for SG Patent Application No. 0607116-1, five pages.
Subatai Ahmad, "A Usable Real-Time 3D Hand Tracker," Proceedings of the $28^{th}$ Asilomar Conference on Signals, Systems and Computers—Part 2 (of 2), vol. 2 (Oct. 1994).
Texas Instruments "TSC2003 / 12C Touch Screen Controller" Data Sheet SBAS 162, dated Oct. 2001, 20-pgs.
U.S. Appl. No. 10/789,676, filed Feb. 27, 2004 entitled "Shape Detecting Input Device".
U.S. Appl. No. 11/015,978, filed Dec. 17, 2004.
U.S. Appl. No. 11/332,861, filed Jan. 13, 2006 which is a Reissue of 6,677,932 listed above.
Wellner, "The Digital Desk Calculators: Tangible Manipulation on a Desk Top Display" IN ACM UIST '91 Proceedings, pp. 27-34, Nov. 1991.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Williams, "Applications for a Switched-Capacitor Instrumentation Building Block" Linear Technology Application Note 3, Jul. 1985, pp. 1-16.
Yamada et al., "A Switched-Capacitor Interface for Capacitive Pressure Sensors" IEEE Transactions on Instrumentation and Measurement, vol. 41, No. 1, Feb. 1992, pp. 81-86.
Yeh et al., "Switched Capacitor Interface Circuit for Capacitive Transducers" 1985 IEEE.
Zhai et al., "Dual Stream Input for Pointing and Scrolling," *Proceedings of CH '97 Extended Abstracts* (1997).
Zimmerman et al., "Applying Electric Field Sensing to Human-Computer Interfaces," In CHI '85 Proceedings, pp. 280-287, 1995.

* cited by examiner

INDIVIDUAL CHANNEL PHASE DELAY SCHEME

FIELD OF THE INVENTION

This invention relates to phase dependent demodulation and processing of analog signals, and more particularly to processing of an analog signal by generating and using a demodulation signal whose phase is controlled in relation to the analog signal.

BACKGROUND OF THE INVENTION

Various electronic devices use oscillating signals to sense external conditions. The external condition can be a user's voice, an incoming radio frequency communication, a user's touch of a button, a user's touch of a touch-screen display, the hover of a finger or another object over a proximity sensitive panel, etc.

Received signals that are used to sense external conditions and/or carry information such as audio, video or multi-touch data often pick up undesired noise in the process. Any wireless signal generated by, for example, a wireless device, such as a Bluetooth or WiFi signal may represent such a noise source. Noise makes processing of the signal to discover the external condition more difficult. Therefore, there is a continuing need for noise suppression circuits. In general, the major challenge in designing noise suppression circuits is the need to reduce portions of the signal considered to be noise in comparison to portions of the signal considered to include useful information.

Therefore, in order for a filter to be effective it often must be configured or tuned in phase and frequency to the signal it is processing. This requirement can cause difficulties when the signals being processed vary in some of their attributes. For example, if the signal being processed is not in phase with the demodulating signal, the dynamic range of the demodulator or filter is reduced therefore effectively reducing the signal to noise ratio, thus making the detection of the relevant signal more difficult.

Embodiments of the present invention are directed to demodulating an incoming signal by using a demodulation signal, while controlling the phase of the demodulation signal in relation to the incoming signal.

The incoming signal is comprised of the data of interest (for example data received from a touch sensitive panel) modulated onto a carrier and a noise component that may be present on the signal, can be processed by being mixed with the demodulation signal The mixing process generates signal components with frequencies that represent the sum and difference of the frequencies of the original signal components and signal components that have the same frequencies. Typically, if the demodulating signal has the same frequency as the incoming signal then, amongst others, signal components at DC and twice the original frequency are generated at the output of the mixer. Typically, following the demodulator stage, is a filter that has a pass band centered around one of the frequency components of interest. For example, if the carrier signal is 200 Khz, the modulation frequency is 10 Hz (this could for example be the rate at which the finger touches the multi-touch panel), the signal to be demodulated would look like a amplitude modulated signal, i.e. have a peak at 200 Khz and one peak each at 200 Khz−10 Hz and 200 Khz+10 Hz. If, for example, the signal is demodulated (mixed) with a 200 Khz signal, one of the components created is the difference of the components. Therefore there would a total of three components (in the absence of noise), 200 Khz−200 Khz=DC, 200 Khz−10 Khz−200 Khz=−10 Hz and 200 Khz+10 Khz+200 Khz=10 Khz. In the example above a subsequent low pass filter with a bandwidth of at least 10 Khz would follow the mixer stage to isolate the 10 Hz component. The amplitude of that 10 Khz component can carry useful information, such as, for example, a capacitance appearing at a touch sensitive panel.

However, in many cases, the phase of the incoming signal can vary as compared to the phase of the demodulation signal. Therefore, in some embodiments, the phase of the modulation signal is changed according to various variables (such as, for example, time) which indicate respective changes of the phase of the incoming signal. In some embodiments, an initialization period is implemented, during which one or more optimal phases of the modulation signal are detected and saved. The modulation signal may later be modified to match the optimal phases discovered during the initialization period.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Although embodiments of the present invention are described herein in relation to an electronic device having multi touch panel, it should be understood that the present invention is not limited to such devices, but is generally applicable to any electronic device which requires the processing and demodulation of incoming oscillating signals.

Figure 1:
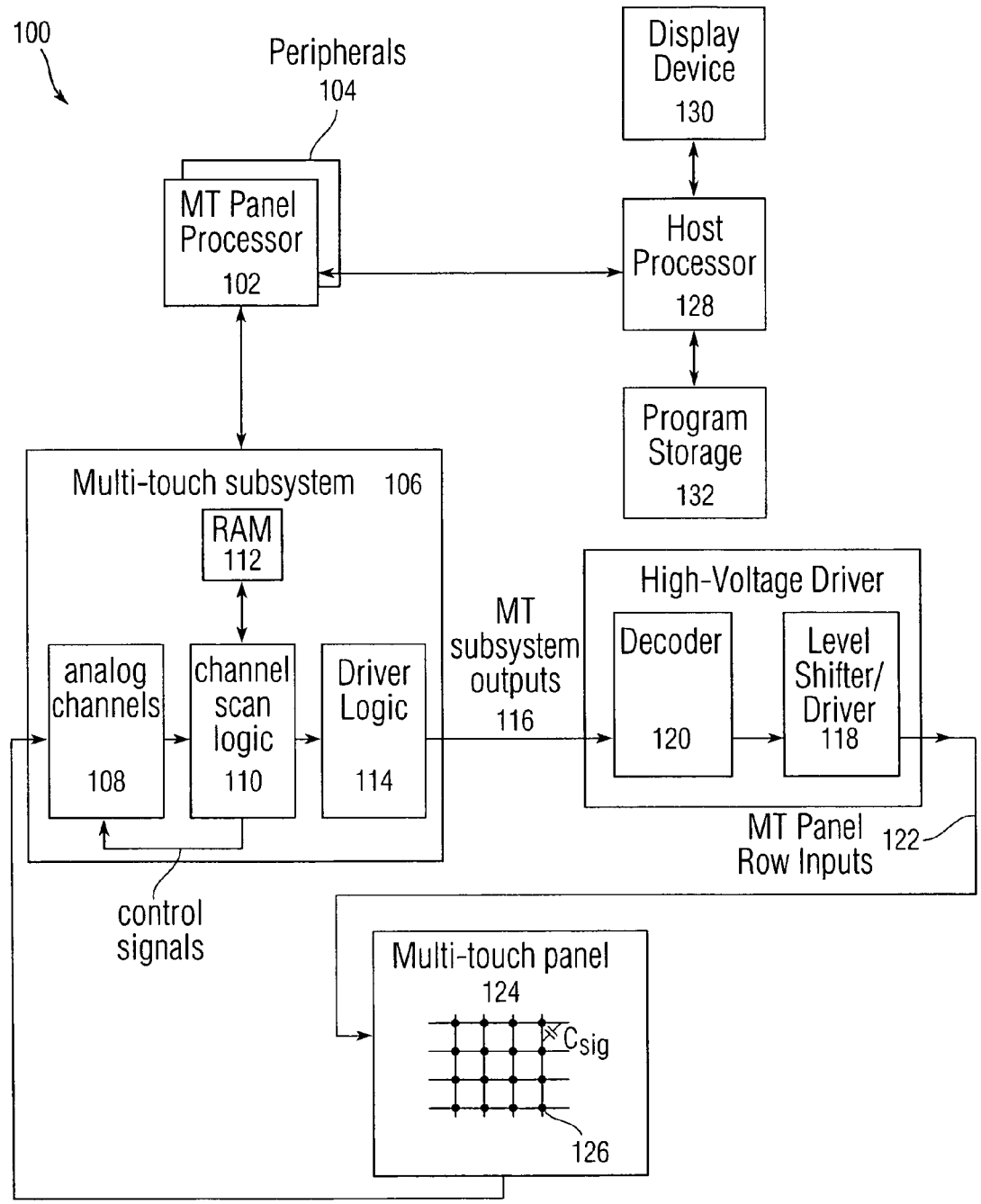
FIG. 1 illustrates an exemplary computing system using a multi touch panel input device.

An embodiment of the present invention is directed to processing an incoming signal using a demodulation signal, while controlling the phase of the demodulation signal in relation to the incoming signal. The embodiments of the present invention can be used in variety of settings. One example of such a setting is an electronic device featuring a touch screen which is configured to detect multiple simultaneous touches thereon. A device including such a touch screen is described by FIGS. 1, 2a-c and 3a-c and the accompanying discussion below. As mention above, the present invention is not limited to the device discussed in FIGS. 1-3 but may be utilized in a variety of different devices.

Multi-touch touch-sensitive panels according to one embodiment of this invention can detect multiple touches (touch events or contact points) that occur at about the same time (and at different times), and identify and track their locations. FIG. I illustrates exemplary computing system 100 that uses multi-touch panel 124. Computing system 100 can include one or more multi-touch panel processors 102 and peripherals 104, and multi-touch subsystem 106. One or more processors 102 can include, for example, ARM968 processors or other processors with similar functionality and capabilities. However, in other embodiments, the multi-touch panel processor functionality can be implemented instead by dedicated logic, such as a state machine. Peripherals 104 may include, but are not limited to, random access memory (RAM) or other types of memory or storage, watchdog timers and the like. Multi-touch subsystem 106 can include, but is not limited to, one or more analog channels 108, channel scan logic 110 and driver logic 114. Channel scan logic 110 can access RAM 112, autonomously read data from the analog channels and provide control for the analog channels. This control can include multiplexing columns of multi-touch panel 124 to analog channels 108. In addition, channel scan logic 110 can control the driver logic and stimulation signals being selectively applied to rows of multi-touch panel 124. In some embodiments, multi-touch subsystem 106, multi-touch panel processor 102 and peripherals 104 can be integrated into a single application specific integrated circuit (ASIC).

Driver logic 114 can provide multiple multi-touch subsystem outputs 116 and can present a proprietary interface that drives high voltage driver, which is comprised of decoder 120 and subsequent level shifter and driver stage 118, although level-shifting functions could be performed before decoder functions. Level shifter and driver 118 can provide level shifting from a low voltage level (e.g. CMOS levels) to a higher voltage level, providing a better signal-to-noise (S/N) ratio for noise reduction purposes. Decoder 120 can decode the drive interface signals to one out of N outputs, whereas N is the maximum number of rows in the panel. Decoder 120 can be used to reduce the number of drive lines needed between the high voltage driver and multi-touch panel 124. Each multi-touch panel row input 122 can drive one or more rows in multi-touch panel 124. In some embodiments, driver 118 and decoder 120 can be integrated into a single ASIC. However, in other embodiments driver 118 and decoder 120 can be integrated into driver logic 114, and in still other embodiments driver 118 and decoder 120 can be eliminated entirely.

Multi-touch panel 124 can in some embodiments include a capacitive sensing medium having a plurality of row traces or driving lines and a plurality of column traces or sensing lines, although other sensing media may also be used. The row and column traces may be formed from a transparent conductive medium, such as Indium Tin Oxide (ITO) or Antimony Tin Oxide (ATO), although other transparent and non-transparent materials, such as copper, can also be used. In some embodiments, the row and column traces can be formed on opposite sides of a dielectric material, and can be perpendicular to each other, although in other embodiments other non-orthogonal orientations are possible. For example, in a polar coordinate system, the sensing lines can be concentric circles and the driving lines can be radially extending lines (or vice versa). It should be understood, therefore, that the terms "row" and "column," "first dimension" and "second dimension," or "first axis" and "second axis" as used herein are intended to encompass not only orthogonal grids, but the intersecting traces of other geometric configurations having first and second dimensions (e.g. the concentric and radial lines of a polar-coordinate arrangement). It should also be noted that in other embodiments, the rows and columns can be formed on a single side of a substrate, or can be formed on two separate substrates separated by a dielectric material. In some embodiments, the dielectric material can be transparent, such as glass, or can be formed from other materials, such as mylar. An additional dielectric cover layer may be placed over the row or column traces to strengthen the structure and protect the entire assembly from damage.

At the "intersections" of the traces, where the traces pass above and below each other (but do not make direct electrical contact with each other), the traces essentially form two electrodes (although more than two traces could intersect as well). Each intersection of row and column traces can represent a capacitive sensing node and can be viewed as picture element (pixel) 126, which can be particularly useful when multi-touch panel 124 is viewed as capturing an "image" of touch. (In other words, after multi-touch subsystem 106 has determined whether a touch event has been detected at each touch sensor in the multi-touch panel, the pattern of touch sensors in the multi-touch panel at which a touch event occurred can be viewed as an "image" of touch (e.g. a pattern of fingers touching the panel).) The capacitance between row and column electrodes appears as a stray capacitance on all columns when the given row is held at DC and as a mutual capacitance Csig when the given row is stimulated with an AC signal. The presence of a finger or other object near or on the multi-touch panel can be detected by measuring changes to Csig. The columns of multi-touch panel 124 can drive one or more analog channels 108 (also referred to herein as event detection and demodulation circuits) in multi-touch subsystem 106. In some embodiments, each column is coupled to one dedicated analog channel 108. However, in other embodiments, the columns may be couplable via an analog switch to a fewer number of analog channels 108.

Computing system 100 can also include host processor 128 for receiving outputs from multi-touch panel processor 102 and performing actions based on the outputs that may include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 may also perform additional functions that may not be related to multi-touch panel processing, and can be coupled to program storage 132 and display device 130 such as an LCD display for providing a user interface (UI) to a user of the device.

Figure 2A:
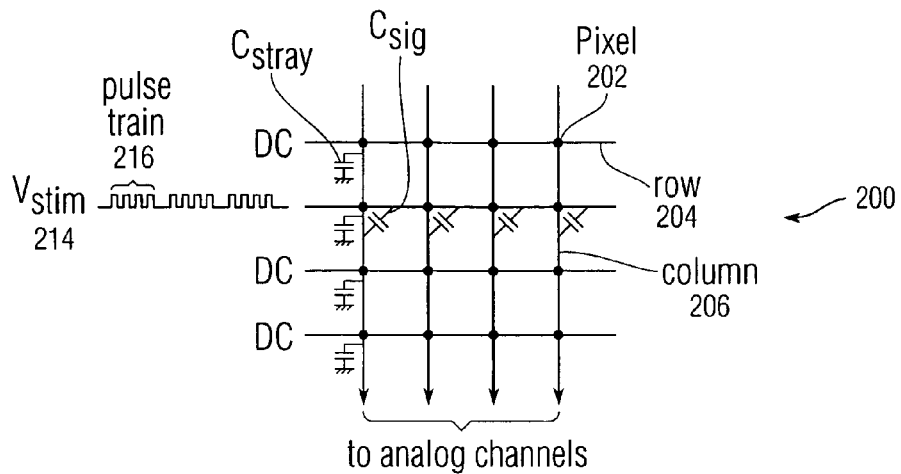
FIG. 2a illustrates an exemplary capacitive multi touch panel.

FIG. 2a illustrates exemplary capacitive multi-touch panel 200. FIG. 2a indicates the presence of a stray capacitance Cstray at each pixel 202 located at the intersection of a row 204 and a column 206 trace (although Cstray for only one column is illustrated in FIG. 2). Note that although FIG. 2a illustrates rows 204 and columns 206 as being substantially perpendicular, they need not be so aligned, as described above. In the example of FIG. 2a, AC stimulus Vstim 214 is being applied to one row, with all other rows connected to DC. The stimulus causes a charge to be injected into the column electrodes through mutual capacitance at the intersecting points. This charge is Qsig=Csig×Vstm. Each of columns 206 may be selectively connectable to one or more analog channels (see analog channels 108 in FIG. 1).

Figure 2B:
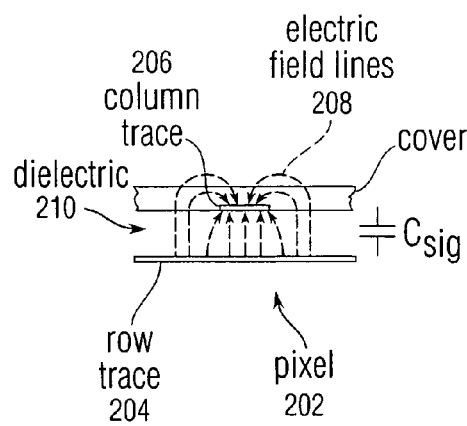
FIG. 2b is a side view of an exemplary capacitive touch sensor or pixel in a steady-state (no-touch) condition.

FIG. 2b is a side view of exemplary pixel 202 in a steady-state (no-touch) condition. In FIG. 2b, an electric field of electric field lines 208 of the mutual capacitance between column 206 and row 204 traces or electrodes separated by dielectric 210 is shown.

Figure 2C:
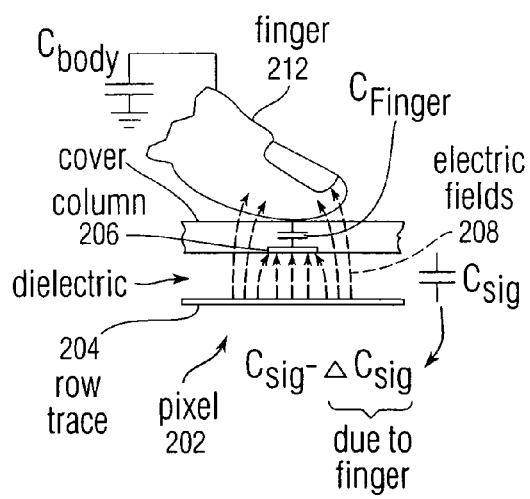
FIG. 2c is a side view of the exemplary capacitive touch sensor or pixel in a dynamic (touch) condition.

FIG. 2c is a side view of exemplary pixel 202 in a dynamic (touch) condition. In FIG. 2c, finger 212 has been placed near pixel 202. Finger 212 is a low-impedance object at signal frequencies, and has a capacitance Cfinger from the column trace 204 to the body. The body has a self-capacitance to ground Cbody of several 100 picofarads where Cbody is much larger than Cfinger. If finger 212 blocks some electric field lines 208 between the row and column electrodes (those fringing fields that exit the dielectric and pass through the air above the row electrode), those electric field lines are shunted to ground through the capacitance path inherent in the finger and the body, and as a result, the steady state signal capacitance Csig is reduced by ΔCsig. In other words, the combined body and finger capacitance act to reduce Csig by an amount ΔCsig (which can also be referred to herein as Csig_sense), and can act as a shunt or dynamic return path to ground, blocking some of the electric fields as resulting in a reduced net signal capacitance. The signal capacitance at the pixel becomes Csig−ΔCsig, where Csig represents the static (no touch) component and ΔCsig represents the dynamic (touch) component. Note that Csig−ΔCsig may always be nonzero due to the inability of a finger, palm or other object to block all electric fields, especially those electric fields that remain entirely within the dielectric material. In addition, it should be understood that as a finger is pushed harder-or more completely onto the multi-touch panel, the finger can tend to flatten, blocking more and more of the electric fields, and thus ΔCsig can be variable and representative of how completely the finger is pushing down on the panel (i.e. a range from "no-touch" to "full-touch").

Referring again to FIG. 2a, as mentioned above, Vstim signal 214 can be applied to a row in multi-touch panel 200 so that a change in signal capacitance can be detected when a finger, palm or other object is present. Vstim signal 214 can include one or more pulse trains 216 at a particular frequency, with each pulse train including of a number of pulses. Although pulse trains 216 are shown as square waves, other waveshapes such as sine waves can also be employed. A plurality of pulse trains 216 at different frequencies can be transmitted for noise reduction purposes to detect and avoid noisy frequencies. Vstim signal 214 essentially injects a charge into the row, and can be applied to one row of multi-touch panel 200 at a time while all other rows are held at a DC level. However, in other embodiments, the multi-touch panel may be divided into two or more sections, with Vstim signal 214 being simultaneously applied to one row in each section and all other rows in that region section held at a DC voltage.

Each analog channel coupled to a column measures the mutual capacitance formed between that column and the row. This mutual capacitance is comprised of the signal capacitance Csig and any change Csig_sense in that signal capacitance due to the presence of a finger, palm or other body part or object. These column values provided by the analog channels may be provided in parallel while a single row is being stimulated, or may be provided in series. If all of the values representing the signal capacitances for the columns have been obtained, another row in multi-touch panel 200 can be stimulated with all others held at a DC voltage, and the column signal capacitance measurements can be repeated. Eventually, if Vstim has been applied to all rows, and the signal capacitance values for all columns in all rows have been captured (i.e. the entire multi-touch panel 200 has been "scanned"), a "snapshot" of all pixel values can be obtained for the entire multi-touch panel 200. This snapshot data can be initially saved in the multi-touch subsystem, and later transferred out for interpretation by other devices in the computing system such as the host processor. As multiple snapshots are obtained, saved and interpreted by the computing system, it is possible for multiple touches to be detected, tracked, and used to perform other functions.

Figure 3A:
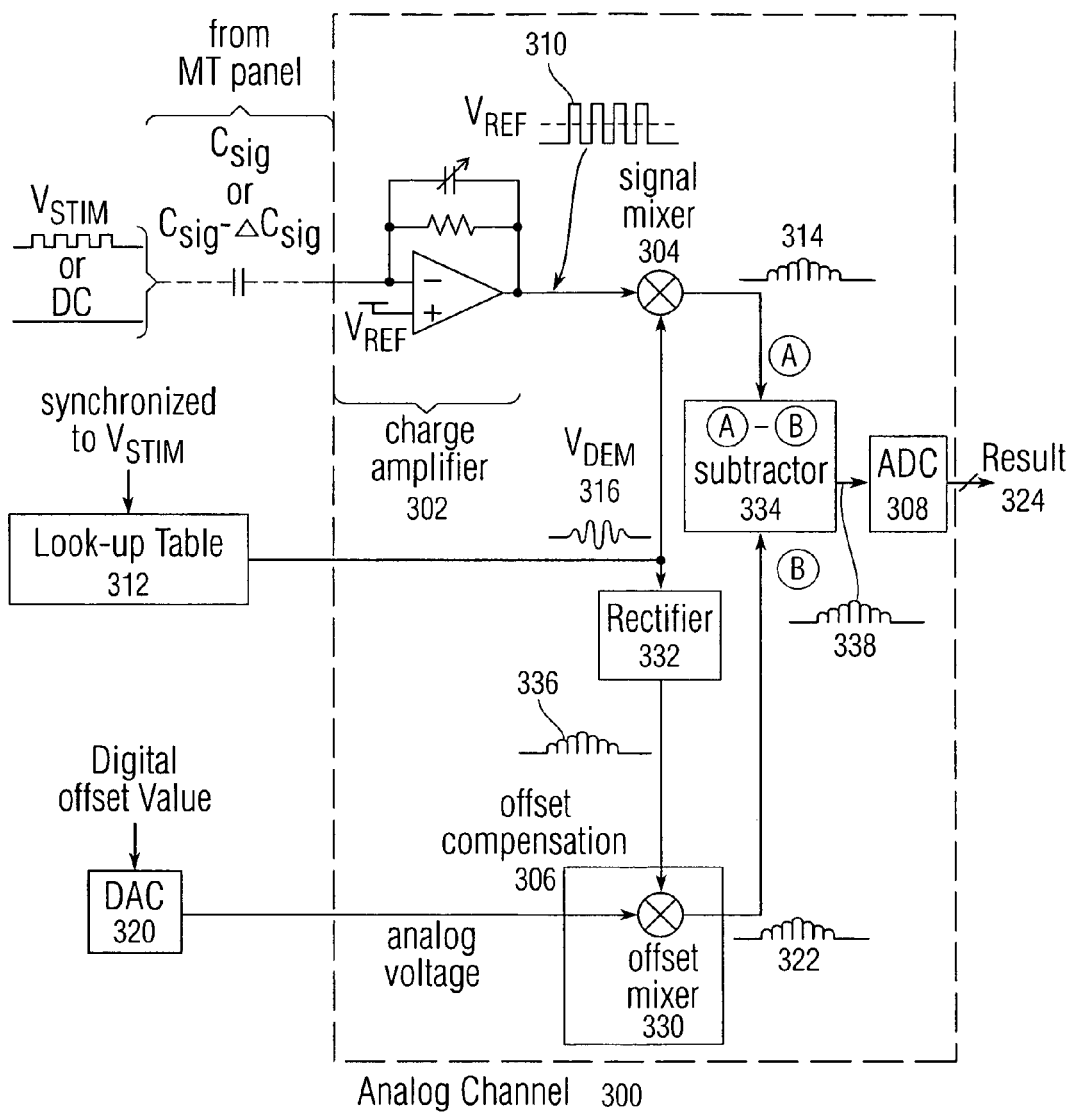
FIG. 3a illustrates an exemplary analog channel.

FIG. 3a illustrates exemplary analog channel or event detection and demodulation circuit 300. One or more analog channels 300 can be present in the multi-touch subsystem. One or more columns from a multi-touch panel can be connectable to each analog channel 300. Each analog channel 300 can include virtual-ground charge amplifier 302, signal mixer 304, offset compensation 306, rectifier 332, subtractor 334, and analog-to-digital converter (ADC) 308. FIG. 3a also shows, in dashed lines, the steady-state signal capacitance Csig that can be contributed by a multi-touch panel column connected to analog channel 300 when an input stimulus Vstim is applied to a row in the multi-touch panel and no finger, palm or other object is present, and the dynamic signal capacitance Csig−ΔCsig that can appear when a finger, palm or other object is present.

Vstim, as applied to a row in the multi-touch panel, can be generated as a burst of square waves or other non-DC signaling in an otherwise DC signal, although in some embodiments the square waves representing Vstim can be preceded and followed by other non-DC signaling. If Vstim is applied to a row and a signal capacitance is present at a column connected to analog channel 300, the output of charge amplifier 302 can be pulse train 310 centered at Vref with a peak-to-peak (p-p) amplitude in the steady-state condition that is a fraction of the p-p amplitude of Vstim, the fraction corresponding to the gain of charge amplifier 302. For example, if Vstim includes 18V p-p pulses and the gain of the charge amplifier is 0.1, then the output of the charge amplifier can be 1.8V p-p pulses. This output can be mixed in signal mixer 304 with demodulation waveform Vdem 316.

Because Vstim can create undesirable harmonics, especially if formed from square waves, demodulation waveform Vdem 316 can be a Gaussian sine wave in an otherwise DC signal that is digitally generated from look-up table (LUT) 312 or other digital logic and synchronized to Vstim. In some embodiments, Vdem 316 can be tunable in frequency and amplitude by selecting different digital waveforms in LUT 312 or generating the waveforms differently using other digital logic. Signal mixer 304 can demodulate the output of charge amplifier 310 by subtracting Vdem 316 from the output to provide better noise rejection. Signal mixer 304 can reject all frequencies outside the passband, which can in one example be about +/−15 kHz around Vdem. This noise rejection can be beneficial in noisy environment with many sources of noise, such as 802.11, Bluetooth and the like, all having some characteristic frequency that can interfere with the sensitive (femtofarad level) analog channel 300. Signal mixer 304 is essentially a synchronous rectifier as the frequency of the signal at its inputs is the same, and as a result, signal mixer output 314 is essentially a rectified Gaussian sine wave.

Offset compensation 306 can then be applied to signal mixer output 314, which can remove the effect of the static Csig, leaving only the effect of ΔCsig appearing as result 324. Offset compensation 306 can be implemented using offset mixer 330. Offset compensation output 322 can be generated by rectifying Vdem 316 using rectifier 332, and mixing rectifier output 336 with analog voltage from a digital-to-analog converter (DAC) 320 in offset mixer 330. DAC 320 can generate the analog voltage based on a digital value selected to increase the dynamic range of analog channel 300. Offset compensation output 322, which can be proportional to the analog voltage from DAC 320, can then be subtracted from signal mixer output 314 using subtractor 334, producing subtractor output 338 which can be representative of the change in the capacitance ΔCsig that occurs when a capacitive sensor on the row being stimulated has been touched. Subtractor output 338 is then integrated and can then be converted to a digital value by ADC 308. In some embodiments, integrator and ADC functions are combined and ADC 308 may be an integrating ADC, such as a sigma-delta ADC, which can sum a number of consecutive digital values and average them to generate result 324.

Figure 3B:
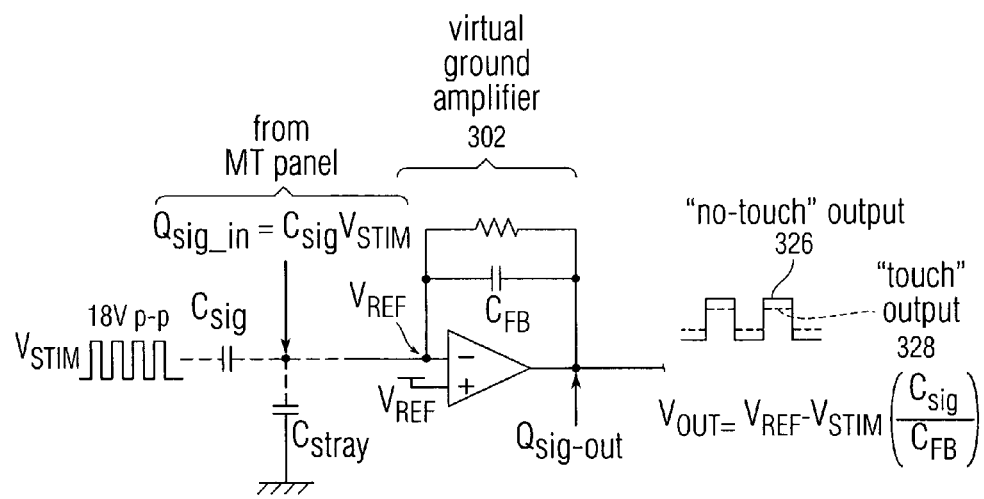
FIG. 3b is a more detailed illustration of a virtual ground charge amplifier at the input of an analog channel, and the capacitance contributed by a capacitive touch sensor and seen by the charge amplifier.

FIG. 3b is a more detailed view of charge amplifier (a virtual ground amplifier) 302 at the input of an analog channel, and the capacitance that can be contributed by the multi-touch panel (see dashed lines) and seen by the charge amplifier. As mentioned above, there can be an inherent stray capacitance Cstray at each pixel on the multi-touch panel. In virtual ground amplifier 302, with the +(noninverting) input tied to Vref, the −(inverting) input is also driven to Vref, and a DC operating point is established. Therefore, regardless of how much Csig is present, the −input is always driven to Vref. Because of the characteristics of virtual ground amplifier 302, any charge Qstray that is stored in Cstray is constant, because the voltage across Cstray is kept constant by the charge amplifier. Therefore, no matter how much stray capacitance Cstray is added to the −input, the net charge into Cstray will always be zero. Therefore the input charge Qsig_sense=(Csig−ΔCsig_sense)Vstim is zero when the corresponding row is kept at DC and is purely a function of Csig and Vstim when the corresponding row is stimulated. In either case, because there is not net charge into Cstray, the stray capacitance is rejected and essentially drops out of any equations. Thus, even with a hand over the multi-touch panel, although Cstray can increase, the output will be unaffected by the change in Cstray.

The gain of virtual ground amplifier 302 is usually small (e.g. 0.1) and is equivalent to the ratio of Csig (e.g. 2 pF) and feedback capacitor Cfb (e.g. 20 pF). The adjustable feedback capacitor Cfb converts the charge Qsig to the voltage Vout. Therefore, the output Vout of virtual ground amplifier 302 is a voltage that is equivalent to the ratio of −Csig/Cfb multiplied by Vstim referenced to Vref. The high voltage Vstim pulses can therefore appear at the output of virtual ground amplifier 302 as much smaller pulses having an amplitude identified by reference character 326. However, when a finger is present, the amplitude of the output can be reduced as identified by reference character 328, because the signal capacitance is reduced by ΔCsig.

Figure 3C:
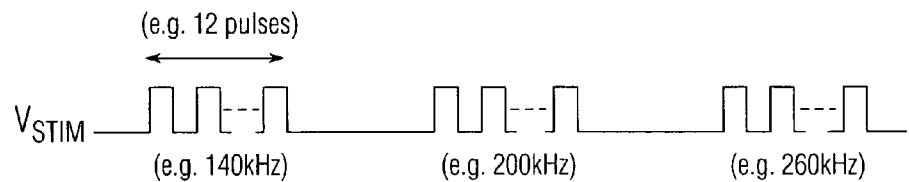
FIG. 3c illustrates an exemplary Vstim signal with multiple pulse trains each having a fixed number of pulses, each pulse train having a different frequency.

FIG. 3c illustrates an exemplary Vstim signal with multiple pulse trains each having a fixed number of pulses, each pulse train having a different frequency (e.g. 140 kHz, 200 kHz, and 260 kHz). With multiple pulse trains at different frequencies, one or more results can be obtained at each frequency. If a static interferer is present at a particular frequency, the results at that frequency can be corrupted as compared to the results obtained at the other two frequencies, and those results can be eliminated. The results at the remaining two frequencies can be averaged to compute the result.

The multiple frequencies may be applied in different ways to the multi-touch panel. In some embodiments, N columns can be connected to one analog channel via N:1 demultiplexer. A given row would then have to be stimulated N times to acquire Csig for all columns and then repeated for the other two frequencies. This has the advantage that fewer channels are needed but it takes longer to process an image. In other embodiments, one channel can be allotted for each column. A given row only has to be stimulated once to acquire Csig for all columns and then repeated for the other two frequencies. This arrangement has the advantage that it is faster then the previous arrangement described earlier; however, it takes more dedicated channels, which may be necessary for large multi-touch panels and when communications are USB, which could drop packets if too slow. After an entire "image" is captured, it can be processed. In further embodiments, multiple stimuli (scan circuits) can be applied to different rows at the same time to speed up the process. The feedback capacitance Cfb and offset can also be programmable.

Embodiments of this invention relate to the use of one or more proximity sensors in combination with one or more touch sensors in a multi-touch panel to detect the presence of a finger, body part or other object and control or trigger one or more functions in accordance with an "image" of touch provided by the sensor outputs. In some embodiments, one or more infrared (IR) proximity sensors or other types of proximity sensors can be driven with a specific stimulation frequency and emit IR light from one or more areas, which can in some embodiments correspond to one or more touch sensor "pixel" locations. The reflected IR signal, if any, can be demodulated using synchronous demodulation. In some embodiments, both physical interfaces (the touch and proximity sensors) can be connected to analog channels in the same electrical core.

The concurrent use of a multi-touch panel along with one or more proximity sensors can provide additional detection and operational capabilities not available with a multi-touch panel by itself. For example, although only the actual touching of a finger, palm or other object upon a touch-sensitive surface can be detected by a touch sensor, the mere hovering of a finger, palm or other object above a surface can be detected due to a change in the output of a photodiode amplifier in the proximity sensor. The detection of a hovering object can enable a computing system to perform certain functions that are preferentially triggered by hovering as opposed to touch. Furthermore, the use of the same analog channel design to receive both the touch sensor outputs in the multi-touch panel and the proximity sensor outputs and generate a value representative of the amount of touch or proximity of an object can enable both touch and proximity sensors to be connected to a single multi-touch subsystem for processing, eliminating the need for separate processing circuitry and reducing overall system costs. The mixer 304 is of special interest with regard to embodiments of the present invention. The mixer takes in output signal 310 of charge amplifier 302 as well as demodulation signal 316. The mixer mixes these signals to produce mixer output signal 314.

As discussed above, the function of the mixer can be to isolate a signal of interest from other signals (i.e., noise). For that purpose the mixer can include a band pass filter at the mixer's output which rejects signals at undesirable frequencies. Thus, as discussed above, the mixer can serve to isolate a modulation signal of interest and reject most noise of frequencies different than that of the modulation signal.

Figure 4:
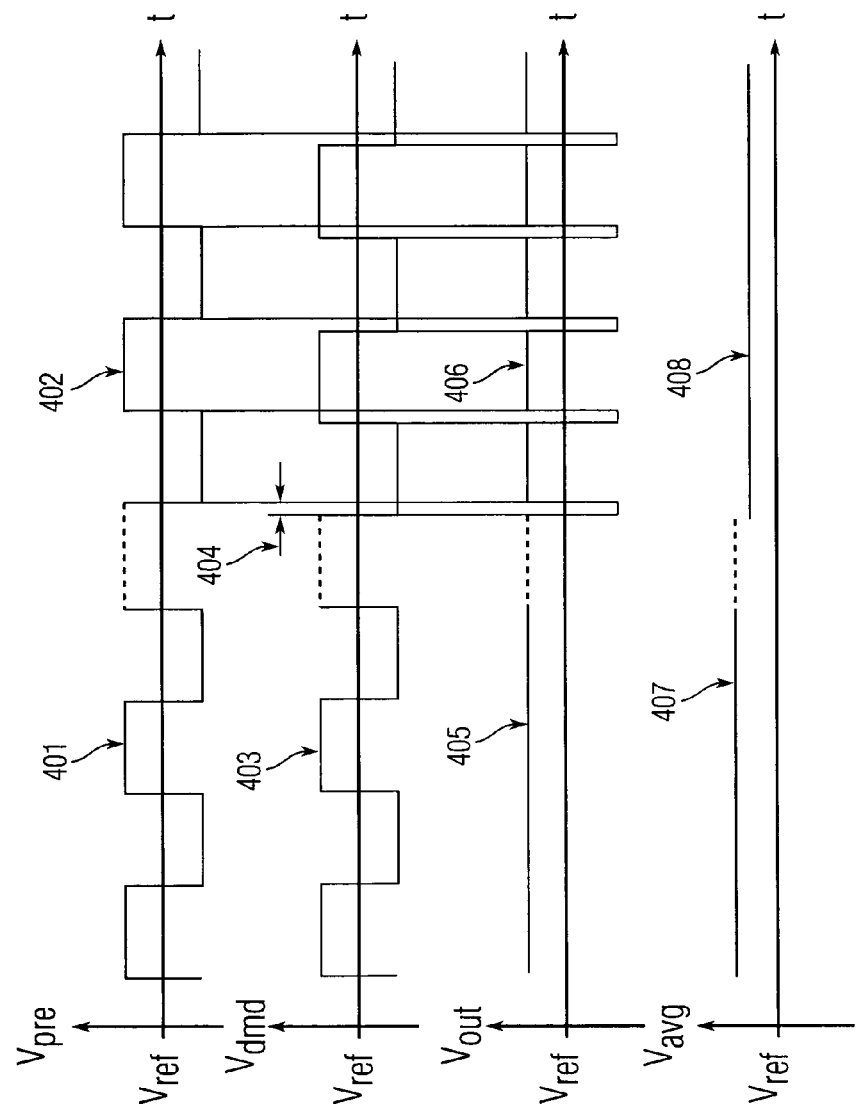
FIG. 4 is a diagram showing the rectification function of a mixer.

Referring to FIG. 4, a preamplifier output signal Vpre (401) is mixed with the demodulation signal 403 synthesized from the demodulation lookup table. Preamplifier output signal 401 can be similar to signal 310 of FIG. 3. Signals 401 and 403 are in phase. For purposes of simplicity, square wave shaped signals are shown but other wave-shapes, such as sinusoidal or other wave-shapes for signals 401, 402 and 403 are possible. The result of mixing. signals 401 and 403 is signal 405—a stable DC signal. However, if a small phase-shift 405 is introduced between the preamplifier output signal 402 and the demodulation signal 403 (e.g., as shown in the right portion of the graph), the resulting signal 406 experiences periodic drops below Vref. Thus, a running average of signal 406 (shown as signal 408 below) is lowered than the average of the signal 405 which resulted when no phase shift was present (this average is shown as signal 407 below. Therefore, any phase shift causes attenuation in the mixer output signal, negatively affecting dynamic range of the system and signal to noise ratio.

If the output of the mixer (signal 314) is not fully rectified (i.e. it is of the type of signal 410)—then the average of the value as generated either by an integrator in the analog domain or generated by an integrating ADC (such as a sigma delta converter) would be below the average value present when incoming and demodulation signal are in phase. This can result in a reduction of the dynamic range of the mixer when the incoming and demodulation signal is not in phase. If the dynamic range is reduced and if the noise level of interfering components stays the same, the signal to noise ratio is reduced degrading the overall performance of the device. One of the degreaded performance parameters could be, for example, the DPI (dots per inch) limit for a given multi-touch panel.

In one embodiment, analog to digital converter 308 may be of the type that performs averaging as well as digital conversion, and it may remove the fluctuations of signal 410 by averaging it. However, in that embodiment the averaging would result in a signal 411 which is of lesser magnitude than the desired signal 400. It should be noted that since the averaging is performed at ADC 308, the average signal 411 is not output at the mixer 304, and is not really present in analog form. Therefore, signal 411 is merely a hypothetical analog signal which reflects the resulting digital value of the ADC 308 if an averaging ADC is used.

In the preferred embodiment, the magnitude of signal 314 is generally the information carrying attribute. More specifically, a signal of lesser magnitude indicates a touch while a signal of greater magnitude indicates the absence of a touch (see FIG. 3b). Therefore, a general decrease of the magnitude of the signal output from ADC 308 (such as with signal 411) would adversely affect the resolution of the system. In other words, there will be less of a difference in magnitude of a 'touch' signal and a 'no touch' signal. Such reduction of resolution is undesirable as it increases the chances of noise causing an incorrect result.

Therefore, it can be important for optimal operation of the device that demodulation signal Vdem is of the same frequency and phase as the stimulation signal Vstim. It is usually not too difficult to ensure that Vdem is of the same frequency as Vstim. Channel scan logic 110 can control the frequency of Vstim and can send a signal to analog channels 108 indicating the frequency. The analog channels can then each generate a respective Vdem at that frequency.

However, ensuring that the phase of Vdem matches that of Vstim can be more challenging. Again, channel scan logic 110 can control the phase of Vstim and indicate that phase to the analog channels. However, in contrast to the frequency, the phase of Vstim may actually change as the signal travels through the various drivers and the multi-touch panel and reaches the analog channels. Furthermore, that phase can be different for different analog channels, and can also change with time as different rows are stimulated.

Figure 5A:
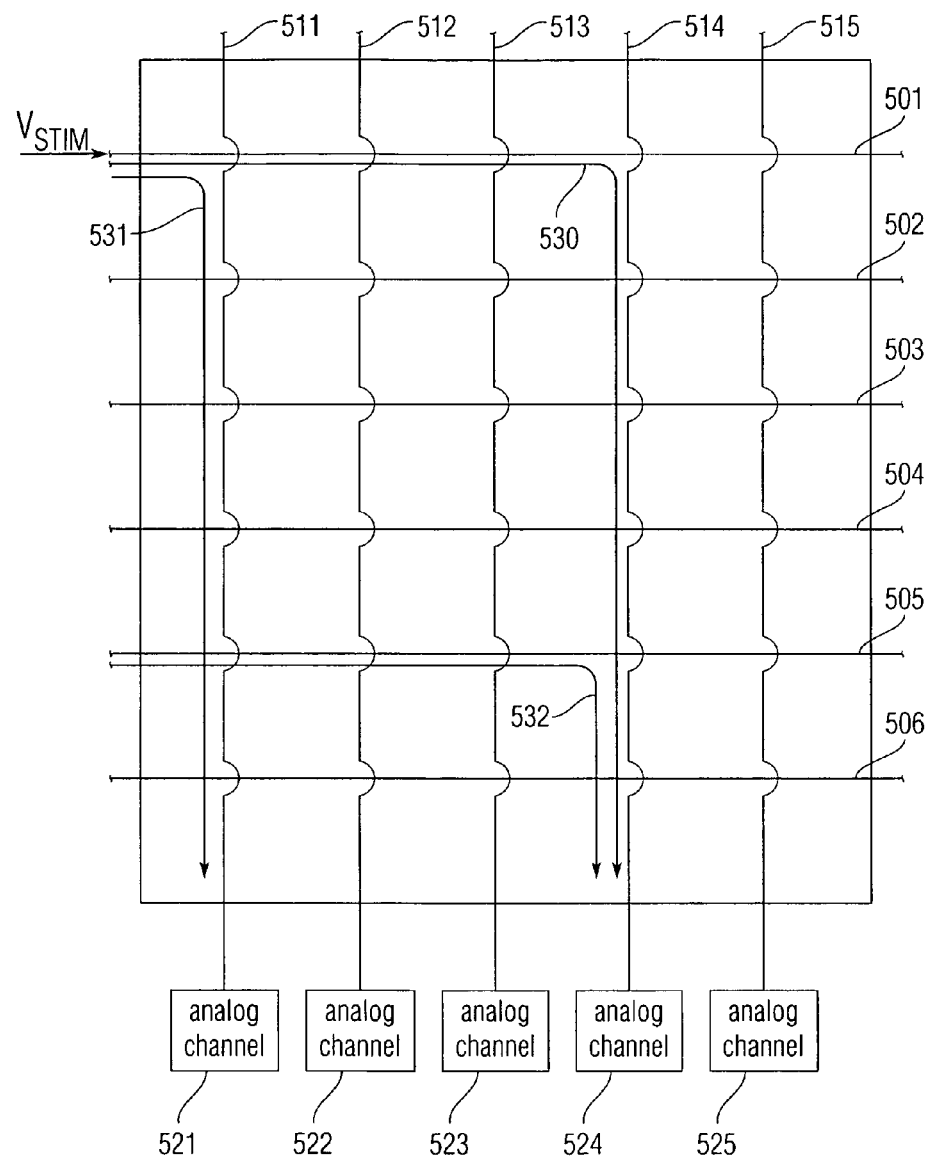
FIG. 5A is a diagram of a portion of the multi touch panel.

FIG. 5A is a diagram of a portion of multi-touch panel 124. A plurality of row electrodes 501-506 and column electrodes 511-515 are shown. Each column electrode can be part of an individual channel of the analog channel, such as channel 300 of FIG. 3a. The Vstim signal can be intermittently sent through each of the rows 501. Preferably, only one row is stimulated at a time. The individual rows may be stimulated in sequence. When a row is stimulated, a charge Qsig is injected via the pixel element Csig formed between the row and column electrode, into the column electrode . The signals formed at the columns are processed by plural analog channels 521-525, as discussed above.

The phase of the signal received at the various analog channels can be different from the phase of the initial stimulation signal Vstim. It can also differ depending on which channel receives the signal as well as on which row is being stimulated. For example, if row 501 is being stimulated, the signal Vstim can travel along path 530 to reach analog channel 524, and along a different path (path 531) to reach analog channel 521. It can be seen that the two paths are of different length. Since two versions of the signal Vstim travel these different lengths to reach the two different analog channels, there will be a difference between the phases of the two signals reflecting the different times it takes the signal to propagate along the two paths.

Figure 5B:
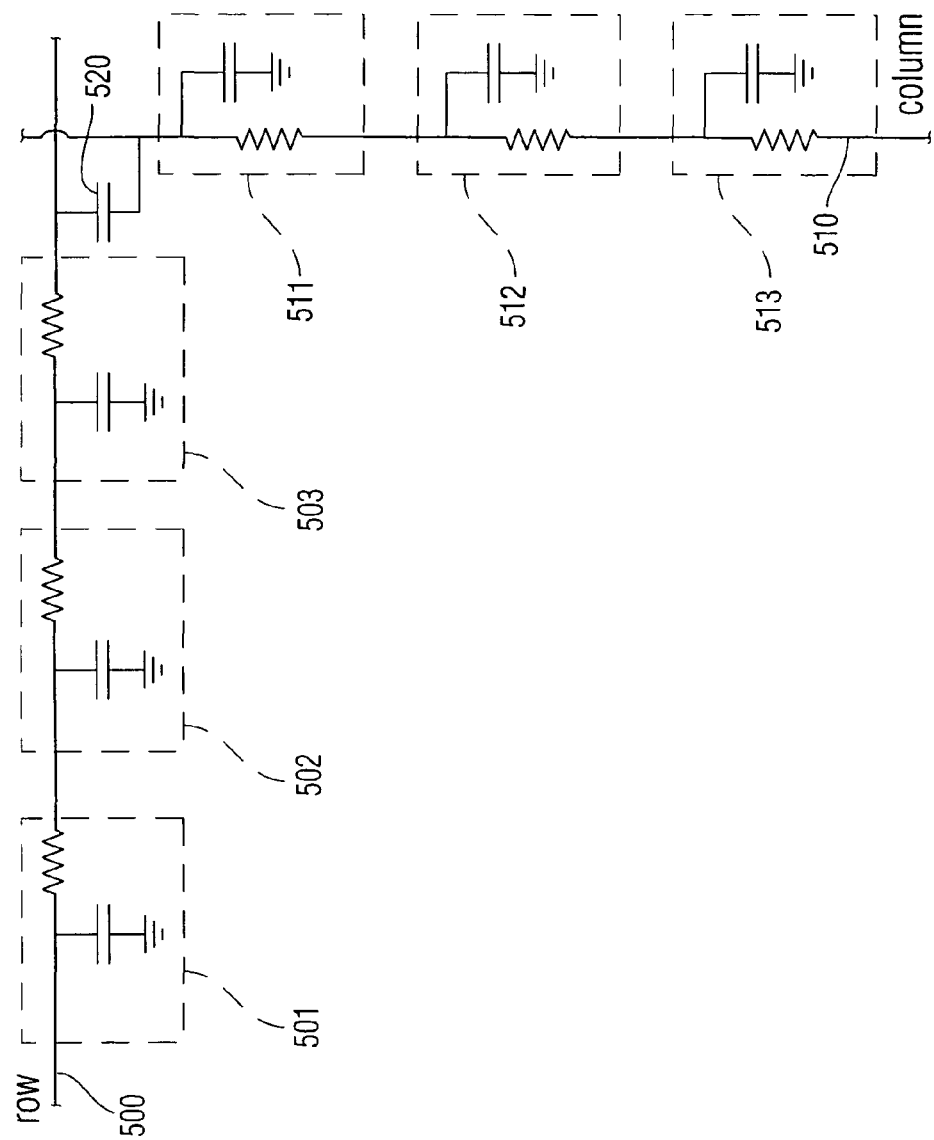
FIG. 5B is a diagram of a portion of the multi touch panel showing resistances and capacitances appearing at the electrodes.

FIG. 5B shows in more detail various capacitances and resistances that appear at the electrodes. More specifically, FIG. 5B shows a portion of the multi touch panel including exemplary row and column. The row electrodes are comprised of N cascaded low-pass filters 501-503, each low pass filter comprised of a resistor representing the trace element between two adjacent columns and the signal capacitance Csig, whereas N is the number of columns. In case of a transparent multi-touch panel where the row electrodes are made of ITO, the total row resistance may be several kilo ohms. Similarly, the column electrodes are comprised of M cascaded low-pass filters 511-513, each low pass filter comprised of a trace element with it's length equivalent to the distance between two adjacent rows and the signal capacitance Csig, whereas M is the total number of rows. The row to column electrodes are coupled via signal capacitance Csig 520, which introduces a high pass filter response. Therefore the panel has a pass-band and transmission line characteristic causing the signal to be delayed when passing from the high voltage driver to a given analog channel. The path delay differs according to how far the signal has to travel.

A single analog channel (such as, e.g. channel 524) may encounter periodic changes of phase of the incoming signals depending on the row that is stimulated. For example, if row 505 were stimulated, the stimulation signal would have to travel along path 532 to get to analog channel 524. This path is apparently different than path 530, through which the signal travels when row 501 is stimulated. Therefore, analog channel 524 can experience incoming signals of different phase depending on which row is being stimulated.

For the above discussed reasons, an embodiment of the present invention provides for individually tuning the phase of the demodulation signal at each analog channel 108 in order to match the phase of the incoming multi-touch panel signal at that analog channel.

To provide a greater degree of flexibility as to the shape of the demodulation signal, embodiments of the present invention provide that a representation of the demodulation signal can be saved in look-up table 312 and generated based on the saved representation. Thus, the demodulation signal can easily be modified if better shapes are discovered.

Figure 6A:
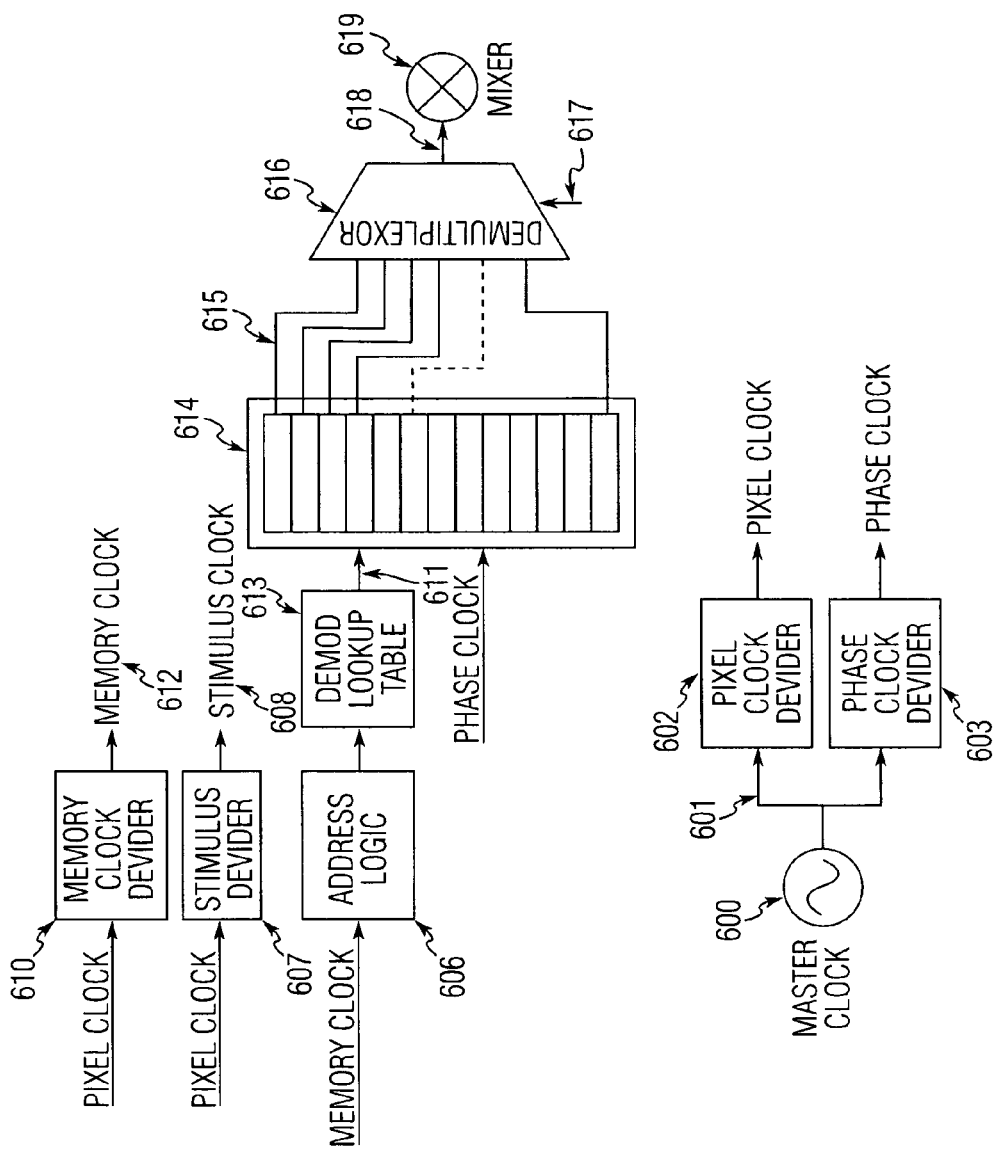
FIG. 6A is a diagram of an exemplary look-up table and an accompanying shift register and timing logic according to one embodiment of this invention.

FIG-6A shows a look up table and associated phase delay logic (including a clock generator. It should be noted that the logic shown in FIG. 6A is generally related to a single channel, and similar logic may be present for all other channels (with the exception that one clock circuit is used for all channels).

The clock generator 600 generates the system clock 601, which is divided down by a pixel clock divider 602 to furnish the pixel clock 605. The phase clock 604 is similarly derived from the system clock 601 via phase clock divider 604.

The pixel clock provides the basic timing for the address logic 606 and is first divided down by the memory clock divider 610 to furnish the memory clock 612 for the address logic 606. The memory clock frequency is essentially the rate at which the demodulation coefficients 611 are retrieved from the demodulation lookup table 613, which contains the consecutive points of a digitized waveform. A MCNT period can be defined as the time 626 between consecutive points on the demodulation waveform 621 to 624.

The demodulation coefficients 611, which in one embodiment could be 5bit two's complement data, are saved into linear shift register 614 and shifted in the shift register at the rate set by the phase clock. The shift register is comprised of a predefined number of stages, whereas the number of stages times the phase clock period is the maximum phase delay that can be accommodated. For example, if the shift register has 64 stages, then the maximum delay would be 64×1/phase_clock_frequency. Thus, in that example, if the phase clock is 10 Mhz the maximum delay would be 6.4 us.

Figure 6B:
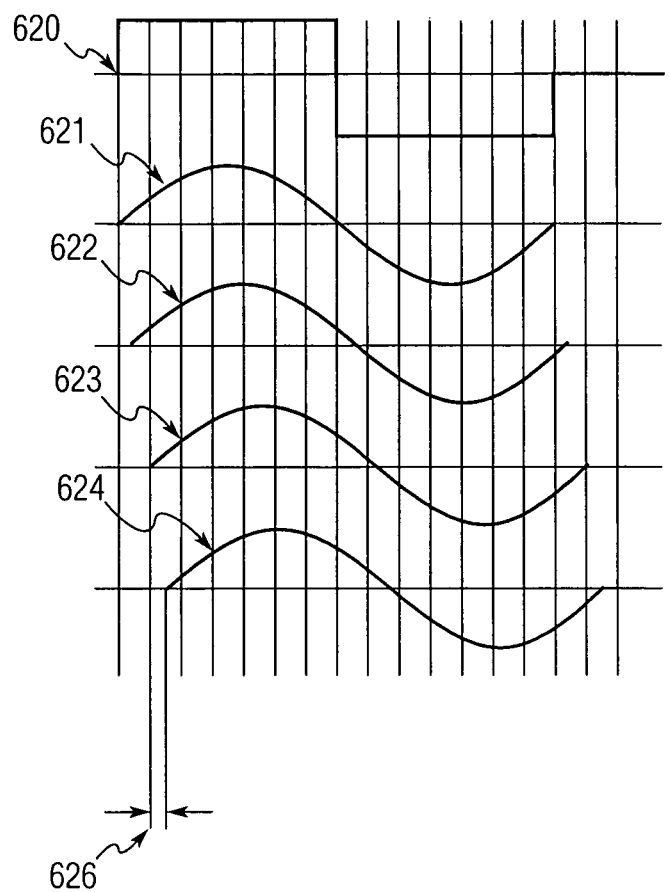
FIG. 6B is a timing diagram showing the various waves that can result from different tap-points of the shift register.

Each stage of the shift register 614 is delayed in respect to the previous stage by one phase clock period. FIG. 6B shows a timing diagram showing the various waves that can result from different tap-points of the shift register. It should be noted that the waveforms shown in FIG. 6 are quantized. Waveform 621 represents the waveform in time coming out of the demodulation lookup table 613, waveform 622 is the digitized waveform as it can be observed on the 1st tap of the shift-register 614, digitized waveform 623 is the waveform as it can be observed on the 2nd tap of the shift-register 614, and so forth.

A multiplexer 616 selects a delayed version 618 of the signal coming out of the demodulation lookup table 613 available at one of the taps of the shift-register and passes it on to the signal mixer 619. The multiplexer can be controlled by a control signal 617 which is related to the desired phase of the demodulation signal. The signal mixer can be a quantized mixer and, as such, can accept digital waveform data directly without digital to analog conversion.

Signal 620 can be the stimulus signal that is passed on to the drive logic. Stimulation clock 608 can be derived from the pixel clock by a stimulus divider 607. Thus, the stimulation frequency depends upon the pixel clock. The digitized waveform stored in the demodulation lookup table 613, the memory clock divider ratio and the stimulus divider ratio are chosen so that the stimulus frequencies of stimulus 620 and the generated demodulation waveform (e.g., waveform 621) are the same. For example, if one period of waveform 621 is described by 16 consecutive points in the demodulation lookup table and the stimulus divider is set to 32, then the memory clock divider ratio would have to be set to 2 since all above clocks are derived from the same time base (pixel clock). In one embodiment, the pixel and phase clocks may be the same. In another embodiment, a phase clock of a higher frequency than that of the pixel clock may be used in order to obtain finer delay granularity at the expense of smaller maximum delay. In general the phase clock is always at least as high in frequency as the pixel clock. The pixel clock can vary in frequency between multiple measurements to combat noise, in a manner similar to a frequency hopping mechanism. If this is the case, the phase clock may either remain constant or may track the pixel clock. Keeping the phase clock independent of the pixel clock provides the advantage that the phase delay becomes independent of the pixel clock therefore only one delay lookup table needs to be allocated for all possible pixel clock frequencies.

In an alternative embodiment, the look up table can be removed and all waveform data can be saved in the shift register. In that embodiment, the shift register can be looping, i.e. it can allow for values to be shifted from one end back to the other end so that no values are lost. Thus, the shift register can include data defining a single waveform which is continuously shifted and looped within the shift register, so that waveform can be observed as repeating at any of the shift register's taps.

Figure 7:
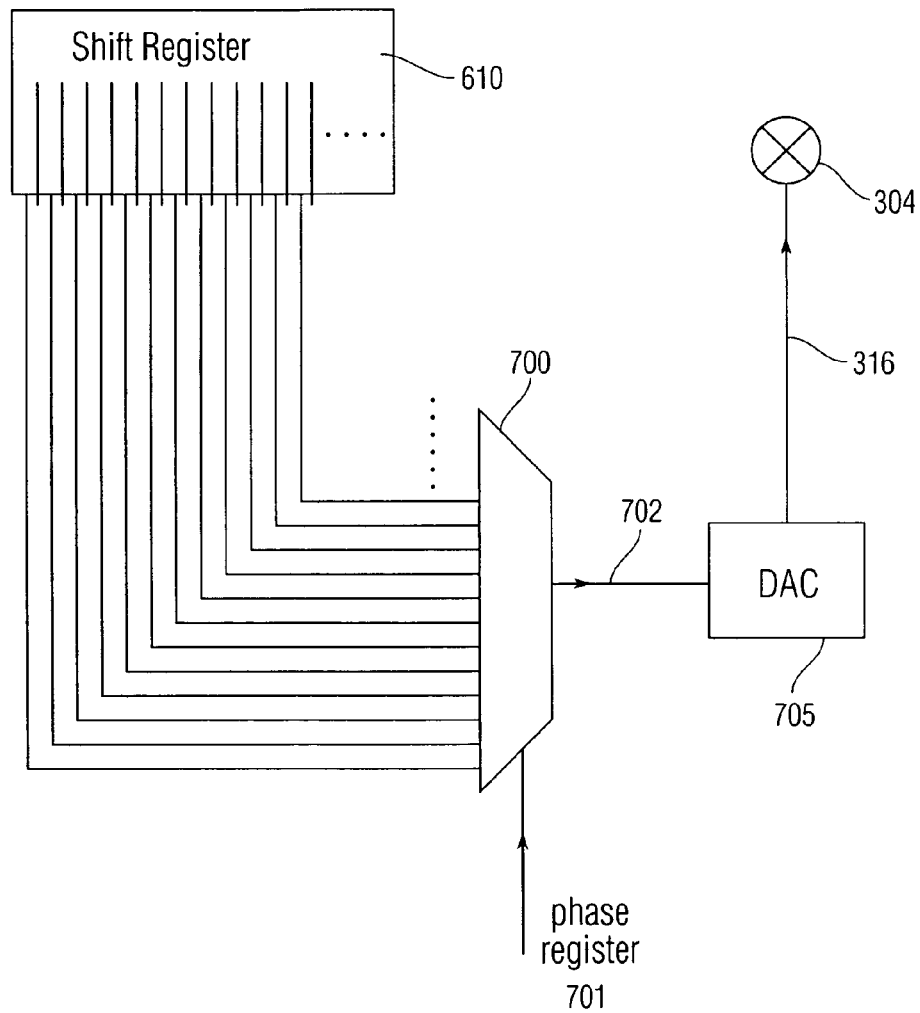
FIG. 7 is a diagram showing channel specific phase tuning logic according to one embodiment of this invention.

FIG. 7 shows channel-specific phase tuning logic used by a channel to control the phase for the demodulation signal for that channel. Shift register 614 is shown. In some embodiments, only a single shift register is used for all channels. The taps of the shift register are connected to different inputs of multiplexer 700. Each tap can be connected to the multiplexer through a line comprising a plurality of bits sufficient to provide the value stored in the cell of the shift register associated with that tap. Therefore, the output of the multiplexer may also be a channel including several parallel lines. While the logic of only one channel is shown in FIG. 7, in practice, the taps of the shift register can be connected to a plurality of multiplexers each associated with a respective channel.

The multiplexer can be controlled by a digital phase selector signal 701. The phase selector signal defines what phase should be used for the demodulation signal of a particular channel. Therefore, a different phase selector signal may be used for each channel. The phase selector signal may also change over time, as the desired phase can change over time.

The phase selector signal selects which tap is to be forwarded to the output of the multiplexer to become multiplexer output signal 702. As discussed above, each tap can, over time, present multiple digital values defining a demodulation wave. The different taps present the demodulation wave at different phases. Thus, by selecting a signal originating from one of the taps based on the phase selector signal, the multiplexer can provide a demodulation wave of a particular phase as its output signal 702.

The phase selector is a digital value representing the desired phase. The phase selector is also preferably a multi-bit value. The phase may be defined through the phase selector in terms of units which are related to the number of values of the shift register and the look-up table. For example, considering the phase in radians, and assuming that the number of values representing a single wave iteration in the shift register is n, then the phase represented by each unit of the phase selector signal is:

$$1 \text{ phase selector signal unit} = 2\pi/n \qquad \text{EQ1}$$

Therefore, if, for example, the value of the phase selector signal is 4 (100 in binary), and the shift register includes 64 values defining a single wave iteration, then the phase selector signal would represent a phase of $4 \times 2\pi/64 = \pi/8$. The generation of the phase selector signal is discussed in more detail below.

As discussed above, the output signal 702 is a digital representation of a demodulation wave having a correct phase for the particular analog channel in which it appears. This signal is sent to Digital to Analog Converter (DAC) 705, to produce the actual analog demodulation signal (signal 316). As discussed above, signal 316 is sent to mixer 304 for demodulation purposes. In one embodiment, the DAC may be part of the mixer. In another, embodiment the mixer may be a quantized mixer and thus may accept the digital signal 702 without a need for conversion.

Figure 8:
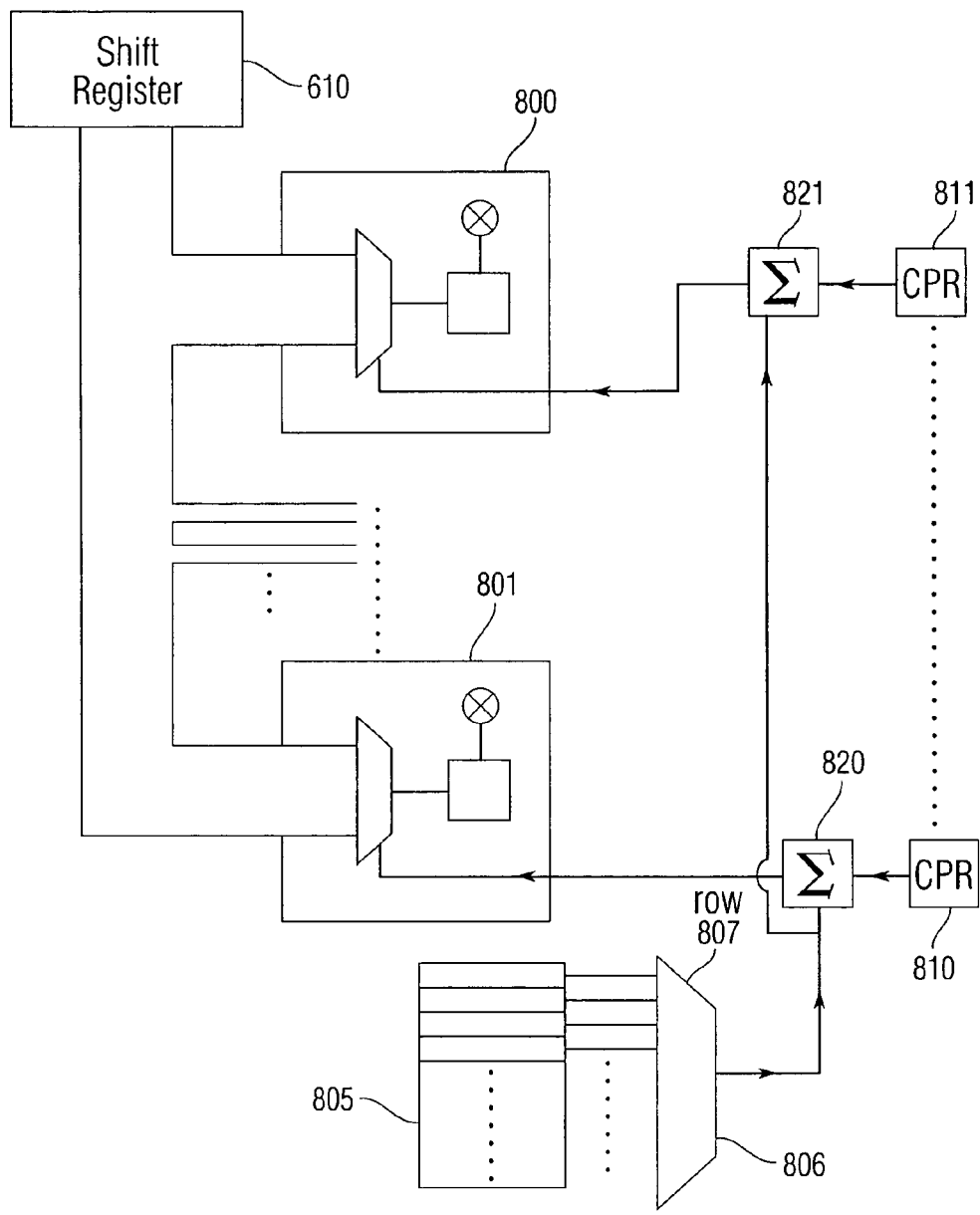
FIG. 8 shows logic for generation of phase selector signals according to one embodiment of this invention.

FIG. 8 shows logic for the generation of the various phase selector signals for the various channels. FIG. 8 shows a plurality of channel specific phase tuning circuits similar to that shown in FIG. 7 (only circuits 800 and 801 are shown due to limited space but other circuits can be present). Each circuit is connected to the taps of shift register 610, as discussed above.

An embodiment of the present invention is designed under the assumption that the phase difference between a signal received at a particular channel from the multi-touch display, and the original stimulation signal Vstim at any time is a sum of two components—a channel specific phase delay depending on the column or the channel, and a row specific phase delay depending on the particular row that is being stimulated at that time. While this may not be an entirely correct assumption, in practice it has been found to be a sufficiently precise one for the purposes of the present embodiment.

Row register 805 can be used to hold values of the phase difference contributed by each row (i.e., row specific phase delay values). Therefore, the row register can include a plurality of values equal to the number of rows in the multi-touch screen. In some embodiments, close rows can be grouped together for the purposes of phase calculation, and thus the row register can only include values for each group of two or more rows. Thus, each value in the shift register can be a digital number reflective of the phase contributed by an associated row of the multi-touch display. The values represent the phase in units discussed above with reference to the phase selector signal 701. The different values need not be equal.

A plurality of cells of the row register (where the values are held) may each feature a tap for reading the values. Each tap can include multiple lines to allow reading of multi-bit values. The row register can also include an interface for storing the row specific phase values. This interface may be the taps as well.

The taps of the row register are connected to a multiplexer 806. The multiplexer selects one of the values based on row selection signal 807. The row selection signal can be a multi-bit signal that signifies which row is being stimulated at a specific time. The row selection signal can be generated and provided by channel scan logic 110 as part of the control signals (see FIG. 1). Channel scan logic 110 controls the stimulation of the multi-touch display and therefore can easily be used to provide a signal indicating which row is being stimulated at any time.

Thus, the row selection signal causes the multiplexer to output a row specific phase delay value associated with the row that is currently being stimulated. As time passes and different rows are stimulated, the row selection signal can change and different values representing the row specific phase delay of different rows are output by multiplexer 806.

Plural channel phase registers are also provided (only channel phase registers 810 and 811 are shown due to limited space but other registers can be present). Each channel phase register is associated with a specific channel of the analog channels. Therefore, each channel phase register is associated with a channel or column electrode of the multi-touch screen. However, as with the row specific phase delay values, in an alternative embodiment multiple channels can use one channel phase register.

Each channel phase register holds a value which indicates a channel specific phase delay for that particular channel. The value in each channel phase register may be multi-bit. The value of each channel phase register is sent to an adder (adders 820, 821 are shown but others can be present for the other channels) which adds it to the current row specific phase delay value provided by multiplexer 806. The adders may be ordinary multi-bit digital adders.

By adding the channel specific and row specific phase delay signals, the adders generate a phase selector signal for each channel (such as, phase selector signal 701). Thus generated, the phase selector signal indicates the total phase difference between the stimulation signal and the channel input signal received at each channel from the multi-touch display. This phase difference can also be the phase that should be applied to the demodulation signal. Once generated by the adders, the phase selector signal can be sent to the various multiplexers associated with each channel's phase tuning circuit (e.g., multiplexer 700).

It is preferred that the row and channel specific phase values are selected so that each single unit of these values is equal to the minimum step in the phase delay as specified by the shift register and the phase clock (e.g., 626 in FIG. 6B). Also, it is preferred that these values are selected so that the addition of a channel specific and row specific phase delay value does not exceed the maximum achievable phase delay as specified by the size of the shift register and the frequency of the phase clock. However, if the size of the shift register and the frequency of the phase clock are such that an entire demodulation wave period is always saved in the shift register, then the adders can be configured to "roll over" if the sum of the channel specific and frequency specific phase delay values is larger than a single wave form.

In one embodiment, the adders can include latches for latching their results, so that no unstable signals are sent to the phase tuning circuits. Also, delays of the circuit of FIG. 8 (such as delays of the adders) can be compensated for by anticipating row selection signal 807. In other words, the row selection signal can be such that it does not indicate the current row being stimulated but a future row about to be stimulated. Thus, the row selector signal may be timed so that by the time the various phase selector signals are generated by the various adders, the stimulation of that future row is initiated.

In an alternative embodiment, a single adder combined with one or more multiplexers and de-multiplexers can be used. The single adder can process the phase selector signal for each channel individually and use the de-multiplexers to latch the different results in different latches associated with the various channels.

A person of skill in the art would recognize that different embodiments can use different methods of generation of the demodulation signal. For example, instead of storing a digital representation of the demodulation signal in a look up table, an analog signal can be generated by an analog circuit (e.g. by using voltage controller oscillators, etc.) The analog signal may be sent to an analog delay circuit which selectively alters the phase of the analog signal. The delay circuit may comprise, for example, multiple capacitors and/or inductors through which the signal travels and which change its phase. The phase selector signal may control the analog delay circuit by selecting different paths through which the demodulation signal may travel, wherein each path causes a different delay of the demodulation signal.

Different methods for generation of the phase selector signal can also be used. For example, instead of storing row and channel phase delay values for each individual row and channel, an embodiment may store a single seed value for a channel and a row each and generate the other values by calculating multiples of the single seed value. In another embodiment, instead of adding channel and row specific phase delay values, a single table may be used which includes a phase delay value of each row and column combination. This single phase delay table can be defined in RAM 112, and may effectively define a unique phase delay value for each pixel in the multi-touch panel. In yet another embodiment, different sets of phase delay values can be saved, wherein each set corresponds to a different stimulation frequency. Values from the different sets can be selected and used in accordance with the stimulation frequency that is currently being applied.

In one embodiment phase delay data can be reduced by only including channel and/or row specific phase delay data for only some of the channels or rows. The phase delay data for channels and/or rows that are not specified can be mathematically interpolated from the phase delay data of specified channels and rows based on known mathematical relations of phase delay. For example, if it has been determined that phase delay increases linearly, then channel specific phase delay data may be provided only for the even numbered channels. The phase delay data for an odd channel can be obtained by taking the average of its even numbered neighbors.

In one embodiment, the various phase delay values can be obtained before manufacture by performing various tests and calculations, and saved in the electronic devices at time of manufacture. However, it is preferred that the phase delay values are obtained by the actual electronic devices themselves during an initialization phase. This is preferred because it may ensure that the various phase delay values are not merely calculated and tested for ideal conditions, but are measured using each device itself, and thus compensate for any differences that may exist between the various manufactured devices.

The various phase delay values may be determined during a phase compensation initialization mode. This mode may be different than the usual boot initialization performed at power up of an electronic device. In one embodiment the phase compensation initialization mode is performed at time of manufacture of the device. Another embodiment may allow for periodic re-initializations of the phase compensation values to be performed, for example, when the device is serviced.

Another embodiment may provide that phase compensation initialization can be triggered by the user of the electronic device, or can be performed at startup of the device. This, however, is not preferred as a user may negatively affect phase compensation initialization by touching the screen during the process.

It is noted that, as discussed above, if ADC 308 is of the averaging type, then if there is a phase difference between demodulation signal 316 and incoming signal 310, the averaging ADC will output a result that is generally lower than it would be if there were no difference. Therefore, during the phase compensation initialization, the electronic device may automatically load different values into row register 805 and the various channel phase registers and monitor the result 324 for each channel. Provided that the multi-touch panel is not being touched, the highest result can be obtained when the optimal row and channel specific phase delay values are loaded in the various registers. The electronic device may repeat this test by stimulating each different row. The electronic device may then save the values which produced in the highest result signal 324 in their respective registers and proceed with ordinary operation.

The above discussed initialization process can be performed by channel scan logic 110. Alternatively, it can be performed by the multi-touch processor which may control the channel scan logic.

Thus, in general, an embodiment of the invention can include a first signal, which is in general a signal that is to be processed (also referred to as the incoming signal). The embodiment may also feature a demodulation signal which is to be used in conjunction with the first signal in the processing of the first signal. The embodiment may feature one or more processing modules (e.g., analog channels) which process different versions of the first signal.

The first signal can be the result of an initially generated stimulation signal which passes through various different circuit and/or external sensors (generally referred to as the traversal circuits) to result in the first signal. Thus, the first signal may differ from the stimulation signal depending on the circuits the stimulation signal goes through to result in the first signal. Versions of the first signal arriving at the different processing modules may differ among each other as well as they may pass through different circuits before they arrive at the processing modules.

In addition, the circuits through which the stimulation signal passes to result in the first signal can change over time. Thus, the difference or the relationship between the initial stimulation signal and the resulting first signal can change with time for any particular processing module.

This embodiment of the invention provides for demodulation circuitry which generates a demodulation signal in such a way as to ensure that the demodulation signal possesses a specific attribute selected in relation to the first signal. More specifically, the demodulation signal should be generated in such a way as to ensure that it has the same phase as the first signal. This is performed by having each processing module generate its own demodulation signal. At each processing module, the phase of the demodulation signal is controlled by referring to (i) a processing module specific value which refers to the difference in phase contributed to the particular circuit associated with the present processing module, and (ii) a timing specific value, which refers to the difference in phase contributed to temporary factors. The timing specific value may change over-time as the circuits through which the first signal must pass may also change. An example of the timing specific value can be the row specific phase delay value, as in one embodiment the temporary difference of the first signal is caused by the periodic stimulation of different rows.

The processing module and timing specific values are stored in memory or registers and are accessed as needed to control the phase of the demodulation signal by each processing module. These values can be obtained during an initialization phase by testing various possible values and determining which ones result in the smallest differences in phase between the demodulation signal and the first signal.

Once the demodulation signal is generated, it is used to process the first signal. The processing can include demodulating, rectifying or performing noise suppression on the first signal. The processing can include combining the first signal and the demodulation signal in a mixer.

As discussed above, the demodulation signal can be used, to demodulate, rectify and/or perform noise suppression for the incoming signal. Therefore, in general, the demodulation signal is a signal that is configured to perform any one of these functions individually or more than one of these functions together, and is not strictly limited to demodulation.

In general, when the present disclosure discusses a matching of the phases of two signals, or generating a signal that has the same phase as another signal, it does not require that the phases be exactly the same. A person of skill in the art would recognize that all engineering endeavors include some uncertainty. Therefore, in this case, it should be understood that the phase is only matched within a reasonable degree of error. For example, in an embodiment where the phase of the generated signal is only able to take on discrete values (as is the case when the phase is controlled using a multi-tapped shifter as discussed above), the phase of the generated signal can only match the phase of the incoming signal within an error range related to the gap between the discrete values.

Figure 9:
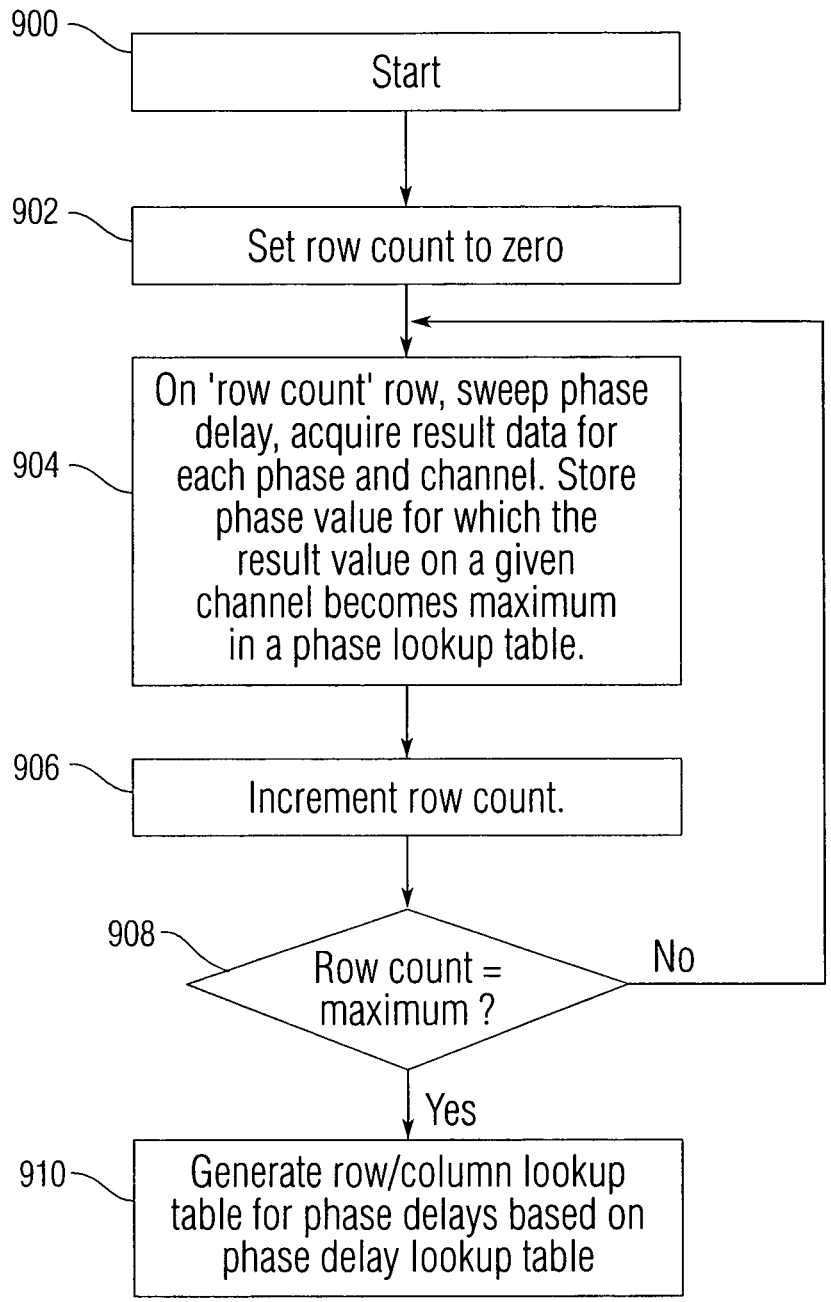
FIG. 9 is a flow chart showing a method of generating predefined row specific and column specific phase delay values.

FIG. 9 is a flow chart showing a method of generating predefined row specific and column specific phase delay values. The method of FIG. 5 can be performed at an initialization stage at time of device manufacture, or during re-initialization operations during the life of the device.

At step 900, the process begins. At step 902, a row count value is set to zero. At step 904, a current row signified by the row count value is stimulated with a stimulating signal. While the stimulating signal is being applied, the phase of the demodulation signal at each channel is swept so that the demodulation signal periodically changes through all phases producible by the shift register. For each channel, the value of the result signals (see signal 324 of FIG. 3a) produced by that channel for each different phase are noted, and the phase which produces the maximum result signal is noted. This maximum result phase can be considered to be the desired phase for the specific row and column combination. At step 906, the row count is incremented. At step 908, it is determined whether the row count has reached its maximum value. If the row count has not reached its maximum value the process returns to step 904, if it has, the process proceeds to step 910. The maximum value of the row count may be the number of rows present.

At step 910, the necessary predefined phase delay values are generated based on the values obtained in the repetitions of step 904. When step 910 is reached, the repetitions of step 904 have resulted in a desired phase delay value for each row and column combination (i.e., each pixel). These values can be used to populate the various tables which define the different desired phase delay values. For example, all desired values can be copied in a single table (placed in RAM, or in register space) which specifies a desired phase delay value for each row and column combination. In the other hand, in the embodiment discussed by FIGS. 7 and 8, mathematical operations must be performed on the values obtained in step 904 in order to determine a channel specific phase delay value associated with each channel and a row specific phase delay value associate with each row. A person of skill in the art would recognize how to obtain these values.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. An electronic device, comprising:
   stimulation circuitry configured to generate a stimulation signal and to send it to one or more traversal circuits, the one or more traversal circuits configured to receive the stimulation signal and to modify it by changing at least its phase, and output the modified stimulation signal as a first signal; and
   a processing module configured to receive the first signal, the processing module further comprising a demodulation circuit including a memory configured to store a processing module specific value, and configured to generate a demodulation signal associated with the first signal and having the same phase and frequency as the first signal;
   wherein the demodulation circuit controls the phase of the demodulation signal by referring to the processing module specific value.

2. The electronic device of claim 1, wherein the one or more traversal circuits include a touch panel.

3. The electronic device of claim 1, wherein the one or more traversal circuits include a proximity sensor panel.

4. The electronic device of claim 1, wherein the processing module further includes a mixer and is configured to mix the first signal and the demodulation signal.

5. The electronic device of claim 4, wherein mixing the first and the demodulation signals results in a signal selected from the group consisting of: a rectified version of the first signal, a demodulated version of the first signal, a noise suppressed version of the first signal, and a demodulated, rectified and noise suppressed version of the first signal.

6. The electronic device of claim 1, further comprising an initialization circuit configured to test various versions of the processing module specific values to determine a version for which the demodulation module produces a match to within predetermined limits between the phases of the demodulation and first signals, and save the version in the memory of the demodulation circuit.

7. The electronic device of claim 1, wherein:
   the traversal circuits through which the stimulation signal travels when being modified to the first signal change over time causing the phase difference between the stimulation signal and the first signal to change over time;
   the electronic device further comprises a plurality of timing specific values associated with the changes of phase difference between the stimulation and first signals over time, each timing specific value being associated with one or more time periods; and
   the demodulation circuit is configured to control the phase of the demodulation signal by referring to the timing specific values as well as the processing module specific value.

8. The electronic device of claim 7, further comprising a test circuit configured to test various versions of the processing module specific value and the timing specific values in order to determine the versions of said values which result in a match to within predetermined limits between the phases of the first signal and the demodulation signal.

9. The electronic device of claim 7, further comprising a plurality of processing modules, wherein:
   a different version of the first signal arrives at each processing module, at least two of said different versions having different phases; and
   each processing module comprises a respective demodulation circuit whose memory includes a respective processing module specific value associated with the phase of the version of the first signal arriving at said processing module.

10. The electronic device of claim 1, wherein the electronic device is a mobile telephone.

11. The electronic device of claim 1, wherein the electronic device is a portable music player.

12. An electronic device comprising:
   a touch panel;
   a driver circuit for sending a stimulation signal to the touch panel; and
   at least one analog channel for receiving an incoming signal from the touch panel, the incoming signal being related to the stimulation signal, the incoming signal having a phase different from that of the stimulation signal, the analog channel further comprising a demodulation circuit for generating a demodulation signal and controlling the phase of the demodulation signal based on a channel specific phase delay value so that it matches the phase of the incoming signal.

13. The electronic device of claim 12, wherein the electronic device further comprises an initialization circuit, configured to test various versions of the channel specific phase delay value to determine a version which results in a demodulation signal whose phase matches the phase of the incoming signal to within predetermined limits, and save the version in the memory of the demodulation circuit.

14. The electronic device of claim 13, wherein the initialization circuit comprises a generally programmable processor running an initialization program.

15. The electronic device of claim 12, wherein the incoming signal results from the passing of the stimulation signal through the touch panel.

16. The electronic device of claim 12, wherein
   the driver circuit is configured to send the stimulation signal to one or more of a plurality of electrodes of the touch panel and to periodically change the electrodes of the touch panel through which the stimulation signal is sent, said changing of electrodes causing a change in the phase of the incoming signal; and
   the demodulation circuit is configured to periodically change the phase of the demodulation signal to reflect the changes of phase of the incoming signal.

17. The electronic device of claim 16, wherein:
   the electronic device comprises a register including a plurality of time specific phase delay values;
   each time specific phase delay value is associated with one or more electrodes through which the stimulation signal can be sent and is related to the resulting phase of the incoming signal if the stimulation signal is sent to said one or more electrodes; and
   the demodulation circuit is configured to periodically access different time specific phase delay values in order to control the phase of the demodulation signal in accordance with periodic changes of the incoming signal.

18. The electronic device of claim 17, wherein the electrodes to which the stimulation signal is sent by the driver circuit are row electrodes and the time specific phase delay values are row specific phase delay values.

19. The electronic device of claim 12, further comprising a plurality of analog channels, each analog channel receiving a respective incoming signal, the incoming signals of at least two of the analog channels having different phase, each analog channel comprising a respective demodulation circuit which generates a respective demodulation signal and controls its phase based on a respective channel specific phase delay value.

20. The electronic device of claim 19 wherein each demodulation circuit controls the phase of its respective demodulation signal based on a combination of a channel specific phase delay value and a plurality of row specific phase delay values.

21. The electronic device of claim 19, wherein the each demodulation circuit controls the phase of its respective demodulation signal based on one or more pixel specific phase delay values obtained from a table of pixel specific phase delay values, wherein each pixel specific phase delay value is associated with a desired phase delay for a particular row and channel combination.

22. The electronic device of claim 21, wherein the table of pixel specific phase delay values is held in RAM.

23. The electronic device of claim 12, wherein the electronic device is a mobile telephone.

24. The electronic device of claim 12, wherein the electronic device is a portable music player.

25. The electronic device of claim 12, wherein the analog channel further includes a mixer configured to mix the incoming signal with the demodulation signal.

26. A method for processing a signal comprising:
   sending a stimulation signal across one or more traversal circuits;
   modifying the stimulation signal by the one or more traversal circuits to form a first signal, the modification including at least a change in phase;
   receiving the first signal at a processing module;
   generating a demodulation signal by a demodulation circuit comprised by the processing module, the demodulation signal having the same phase as the first signal; and
   processing the first signal with reference to the demodulation signal;
   wherein the demodulation circuit controls the phase of the demodulation signal by referring to a processing module specific value.

27. The method of claim 26, wherein the processing of the first signal with reference to the demodulation signal is performed by mixing the first signal and the demodulation signal.

28. The method of claim 27, wherein the mixing produces a signal selected from the group consisting of: a demodulated version of the first signal, a rectified version of the first signal, a noise suppressed version of the first signal and a demodulated, rectified and noise suppressed version of the first signal.

29. The method of claim 27, further comprising:
   changing the traversal circuits periodically so that the phase of the first signal changes periodically; and
   changing the phase of the demodulation signal periodically by the demodulation circuit so that the phase of the demodulation signal matches the phase of the first signal.

30. The method of claim 29, wherein the changing of the phase of the demodulation signal periodically is performed by referring to one of a plurality of time specific values, the time specific values being associated with the periodic changes of the phase of the first signal, in combination with the processing module specific value.

31. The method of claim 26, further including:
testing a plurality of versions of the processing module value;
discovering a version that results in a match to within predetermined limits of the phases of the demodulation signal and the first signal; and
saving the version as the processing module specific value.

32. A method for processing information on a sensor panel, the method comprising:
sending a stimulation signal to the panel;
receiving an incoming signal at an analog channel, the incoming signal being related to the stimulation signal, but having a different phase than the stimulation signal;
generating a demodulation signal at a demodulation circuit;
controlling the phase of the demodulation signal based on a channel specific phase delay value to ensure it matches that of the incoming signal; and
processing the incoming signal with reference to the demodulation signal.

33. The method of claim 32, wherein the processing of the incoming signal includes mixing the incoming signal with the demodulation signal at a mixer.

34. The method of claim 32, further including:
testing a plurality of versions of the channel specific phase delay value;
discovering a version that results in a match to within predetermined limits of the phases of the demodulation signal and the incoming signal; and
saving the version as the channel specific phase delay value.

35. The method of claim 32, wherein
sending a stimulation signal to the panel further comprises periodically sending the stimulation signal to different groups of one more electrodes the groups being selected from a plurality of electrodes of the panel;
said stimulation of different groups of electrodes results in periodic changes of the phase of the incoming signal, depending on which group is being stimulated; and
controlling the phase of the demodulation signal further includes periodically changing the phase of the demodulation signal to match the periodic changes of the phase of the incoming signal.

36. The method of claim 35, wherein the periodically changing the phase of the demodulation signal is performed by referring to a plurality of time specific phase delay values, each time specific phase delay value being associated with a phase of the incoming signal caused by the stimulation of a respective group of electrodes.

37. The method of claim 36, further including the step of interpolating an unknown time specific phase delay value from one or more known time specific phase delay values.

38. The method of claim 36, wherein the method is performed by a plurality of analog channels, each analog channel experiencing different phase delay at a given time, and the controlling the phase of the demodulation signal further includes referring to one of a plurality of channel specific phase delay values associated with the analog channel by which the method is performed.

39. The method of claim 38, further including the step of interpolating an unknown channel specific phase delay value from one or more known channels specific phase delay values.

40. The method of claim 36, further including:
testing a plurality of versions of each of the time specific phase delay value from the plurality of time specific phase delay values;
discovering a version for each respective time specific phase delay value that results in a match to within predetermined limits of the phases of the demodulation signal and the incoming signal; and
saving the discovered versions as the plurality of time specific phase delay values.

41. The method of claim 32, wherein the sensor panel is a touch panel.

42. The method of claim 32, wherein the sensor panel is a proximity sensor panel.

43. The method of claim 32, wherein the controlling the phase of the demodulation signal further comprises:
placing a digital representation of a single wave iteration of the demodulation signal in a shift register, having multiple tap points;
shifting the values within the shift register periodically, so that different values defining a digital representation of a demodulation wave appear at each tap point;
inserting values shifted out of one end of the shift register into the other end of the shift register; and
selecting one of the multiple tap points based on a desired phase of the demodulation signal.

44. A mobile telephone comprising:
a touch panel;
a driver circuit for sending a stimulation signal to the touch panel;
at least one analog channel for receiving an incoming signal from the touch panel, the incoming signal being related to the stimulation signal, the incoming signal having a phase different from that of the stimulation signal, the analog channel further comprising a demodulation circuit for generating a demodulation signal and controlling the phase of the demodulation signal based on a channel specific phase delay value so that it matches the phase of the incoming signal.

45. A portable music player comprising:
a touch panel;
a driver circuit for sending a stimulation signal to the touch panel;
at least one analog channel for receiving an incoming signal from the touch panel, the incoming signal being related to the stimulation signal, the incoming signal having a phase different from that of the stimulation signal, the analog channel further comprising a demodulation circuit for generating a demodulation signal and controlling the phase of the demodulation signal based on a channel specific phase delay value so that it matches the phase of the incoming signal.

46. A method for controlling the phase of a demodulation signal comprising:
placing a digital representation of at least part of the demodulation signal in a shift register including a plurality of tap points;
shifting the values within the shift register according to a phase clock, so that different values defining a digital representation of a demodulation wave appear at each tap point;
selecting a tap point as a source of a demodulation wave, the selection being based on a desired phase of the demodulation signal; and
changing the frequency of the clock in order to control the granularity of the digital representation of at least part of the demodulation signal as well as the size of the portion of the demodulation signal whose digital representation is placed in the shift register.

47. A method for initializing a plurality of desired phase delay values in an electronic device featuring a touch panel comprising a plurality of rows and a plurality of channels intersecting the rows, a stimulation circuitry for sending a stimulation signal to one or more of the rows, and analog channels for detecting signals from respective channels of the touch panel, the method comprising performing the following steps for each row of the plurality of rows:

sending a stimulation signal to the row;
generating a demodulation signal by each analog channel;
sweeping the phase of each demodulation signal so that demodulation signals of a plurality of different phases are generated by each analog channel;
detecting at each analog channel a plurality of results, each result being based on the stimulation signal and the demodulation signal applied at a particular time;
determining at each analog channel the highest result, and the phase of the demodulation signal associated with the highest result; and
saving the determined phase by each analog channel as a desired phase delay value associated with the combination of the row and the respective analog channel,
wherein the method results in plurality of desired phase delay values, which are usable during ordinary operation of the device to control the phase of the demodulation signal for each analog channel.

48. The method of claim 47, further including processing the plurality of desired phase delay values to obtain a decreased number of phase delay values, wherein said processing step is performed once for each initialization.

49. The method of claim 48, wherein the processing includes obtaining a plurality of row specific phase delay values and a plurality of channel specific phase delay values.

* * * * *

UNITED STATES PATENT AND TRADEMARK OFFICE
CERTIFICATE OF CORRECTION

| | | |
|---|---|---|
| PATENT NO. | : 8,493,330 B2 | Page 1 of 1 |
| APPLICATION NO. | : 11/650203 | |
| DATED | : July 23, 2013 | |
| INVENTOR(S) | : Christoph Horst Krah | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1212 days.

Signed and Sealed this
Twenty-fourth Day of February, 2015

Michelle K. Lee
*Deputy Director of the United States Patent and Trademark Office*